March 8, 1927.

W. G. FORDING

CORD TIRE MACHINE

Filed Jan. 12, 1923

INVENTOR
William G. Fording
BY
ATTORNEY

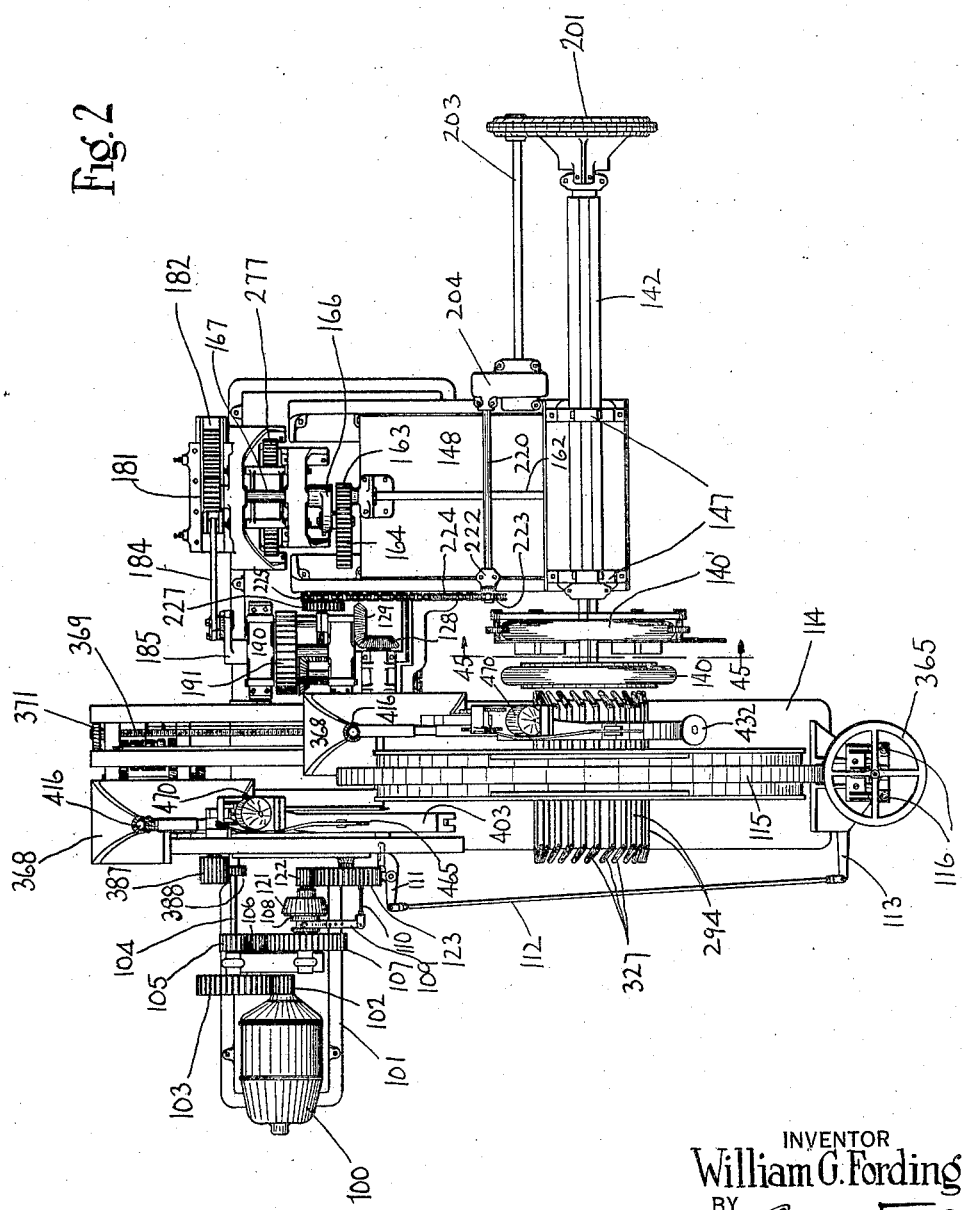

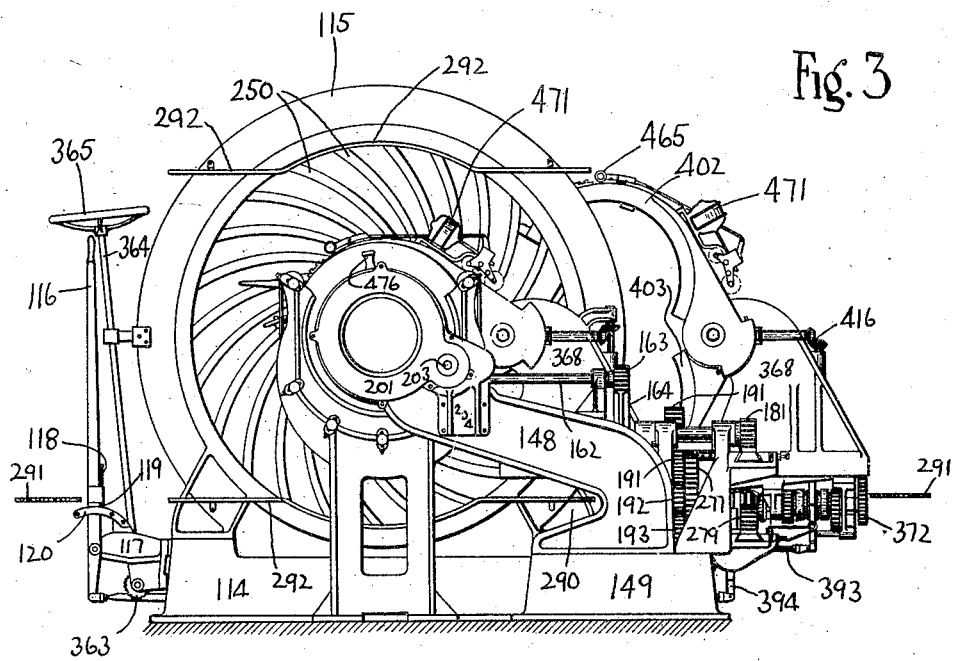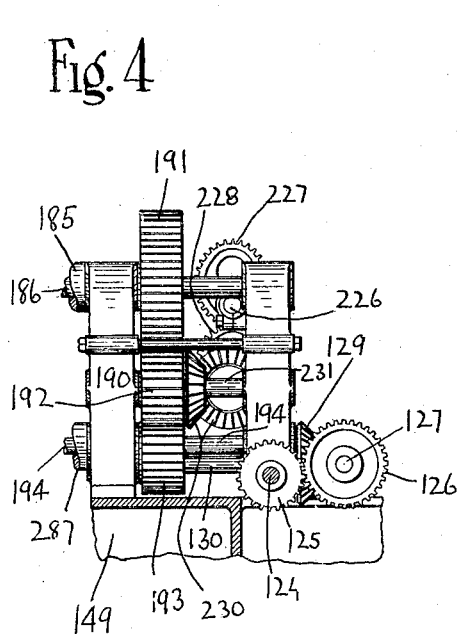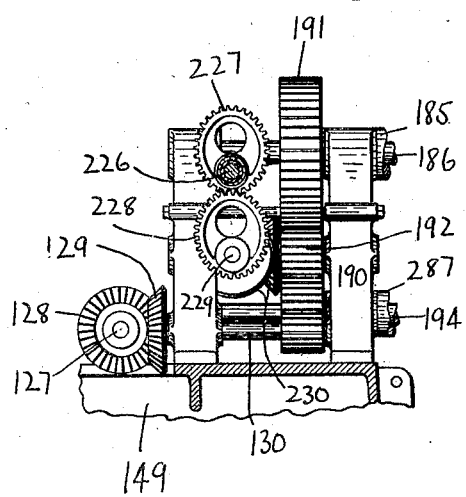

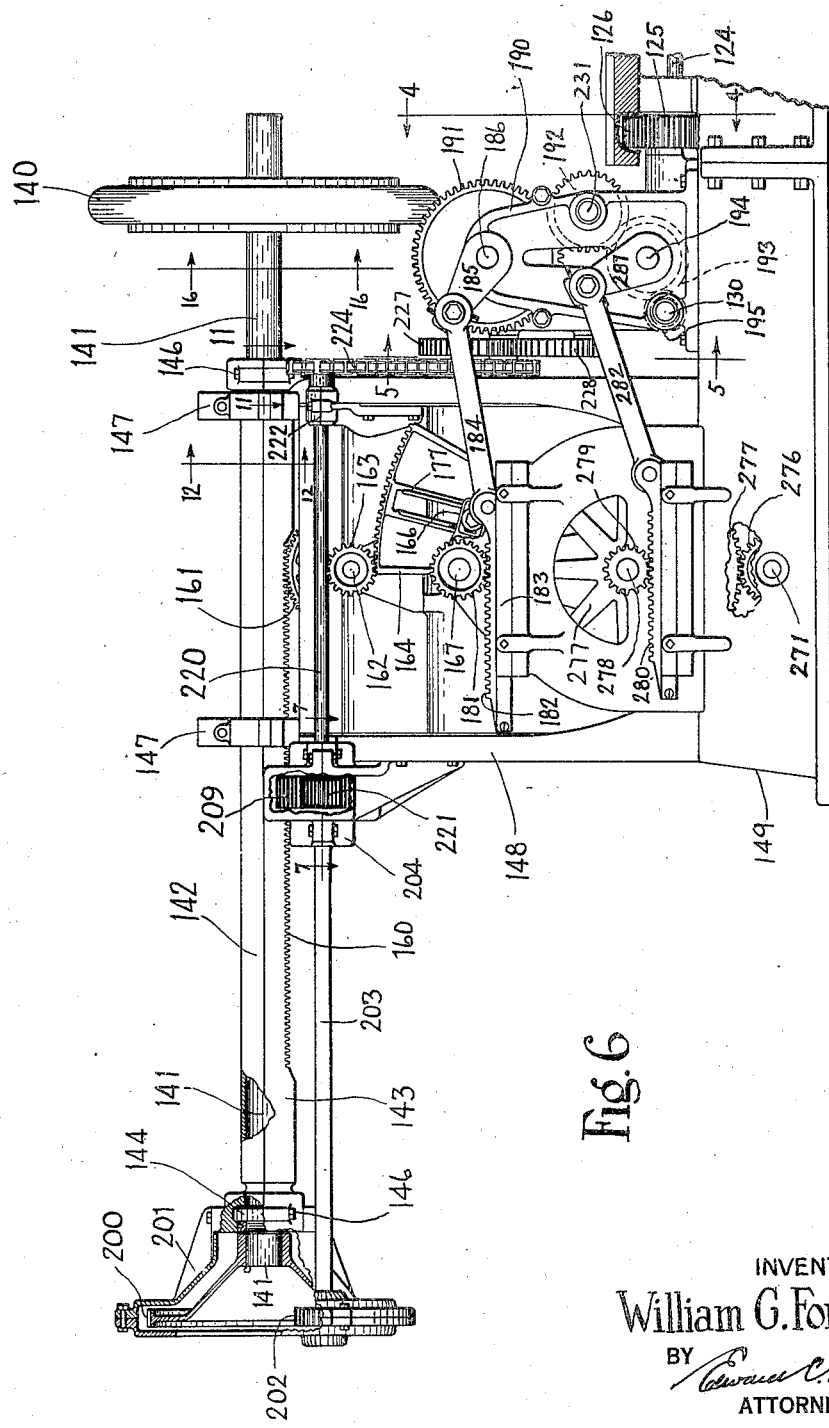

March 8, 1927. 1,620,092
W. G. FORDING
CORD TIRE MACHINE
Filed Jan. 12, 1923 19 Sheets-Sheet 5
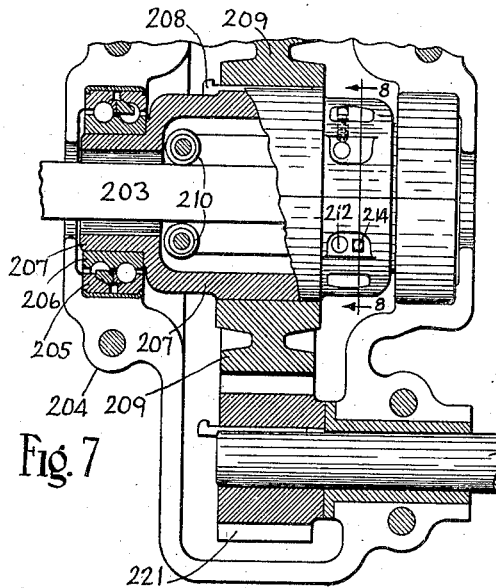
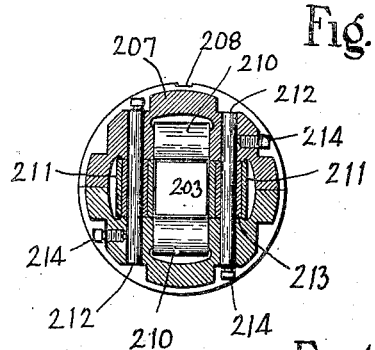
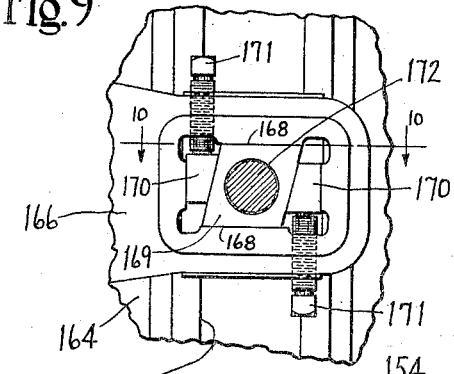
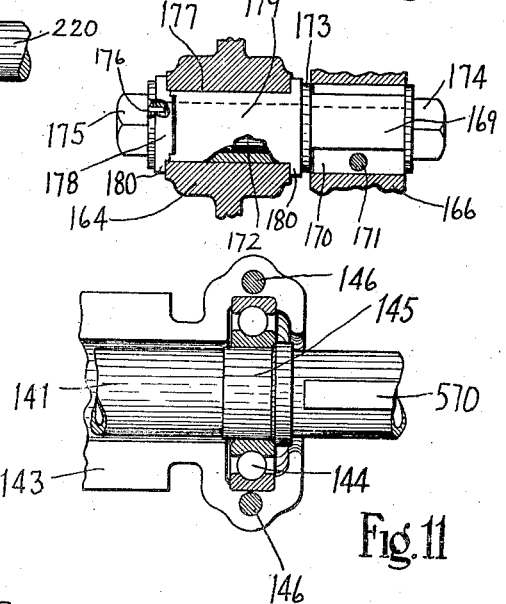
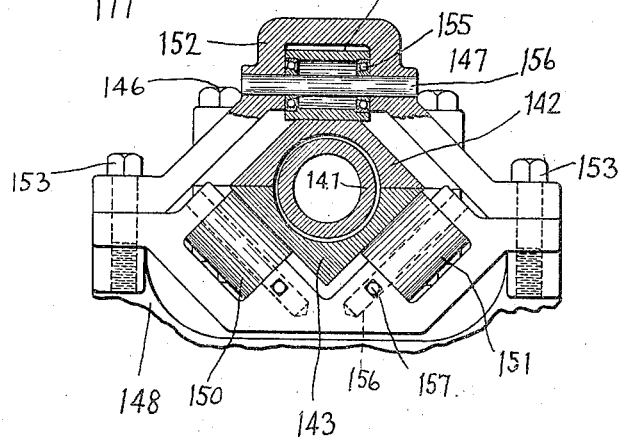
INVENTOR
William G. Fording
BY
ATTORNEY March 8, 1927.
W. G. FORDING
CORD TIRE MACHINE
Filed Jan. 12, 1923
1,620,092
19 Sheets-Sheet 6
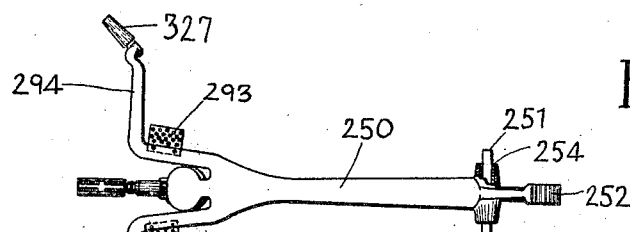
Fig. 13
Fig. 14
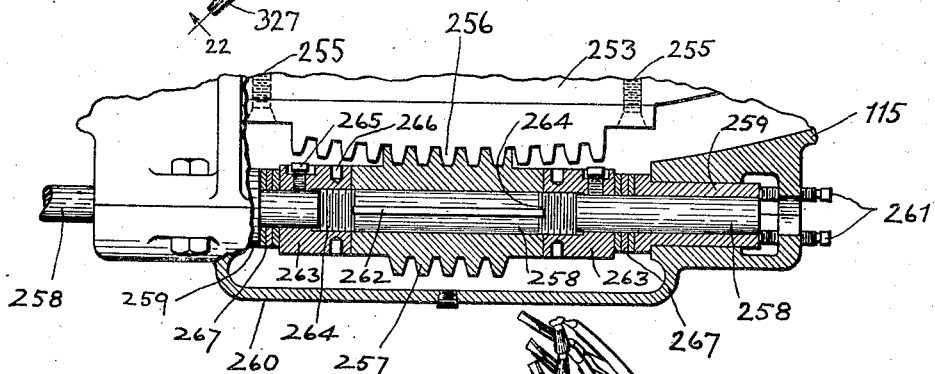
Fig. 15
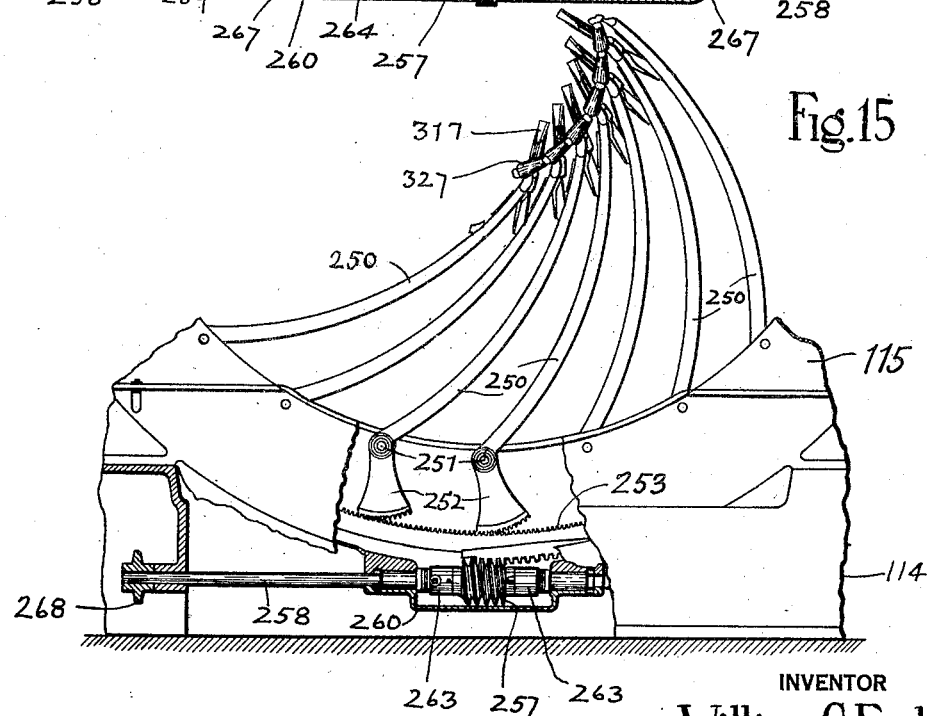
INVENTOR
William G. Fording
BY
ATTORNEY March 8, 1927. 1,620,092
W. G. FORDING
CORD TIRE MACHINE
Filed Jan. 12, 1923 19 Sheets-Sheet 7
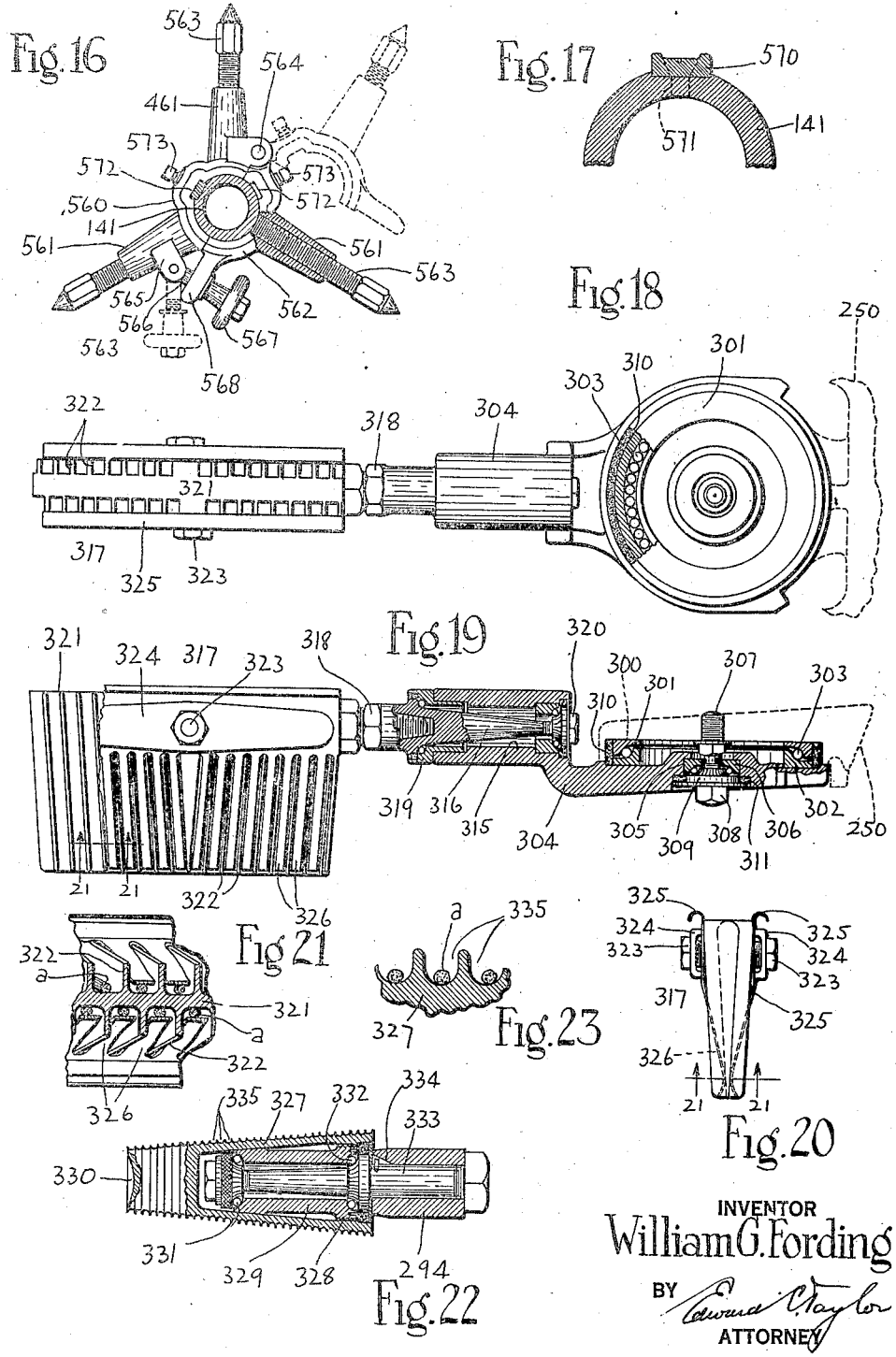

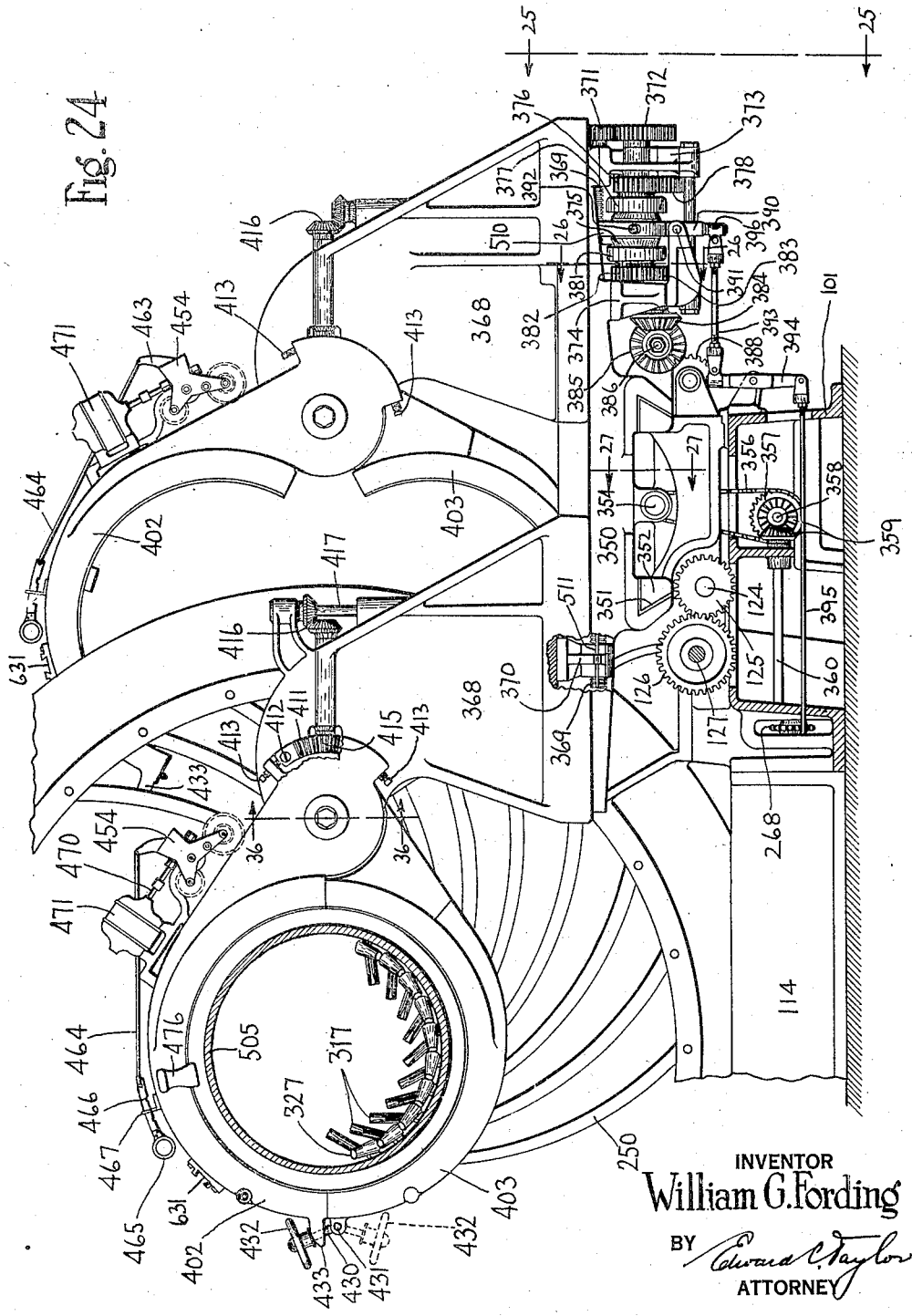

March 8, 1927. W. G. FORDING 1,620,092
CORD TIRE MACHINE
Filed Jan. 12, 1923  19 Sheets-Sheet 9
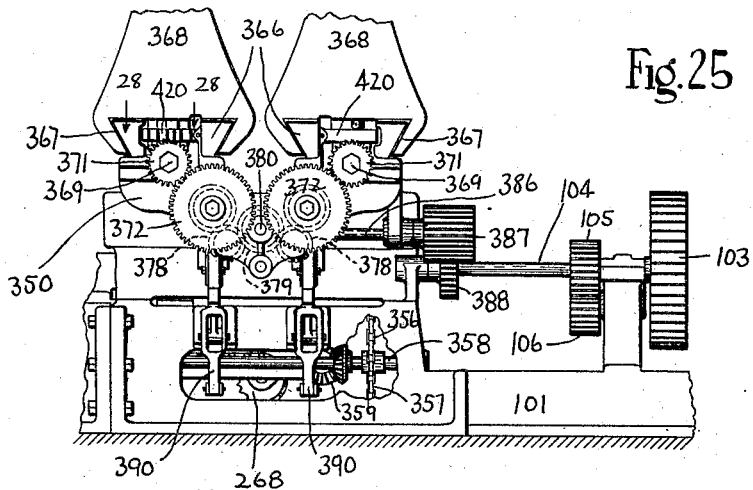
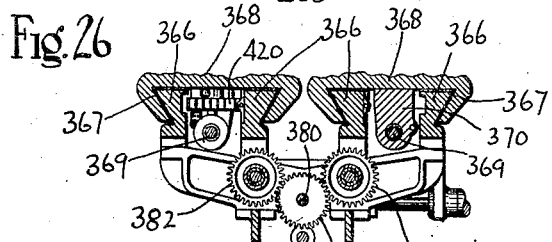
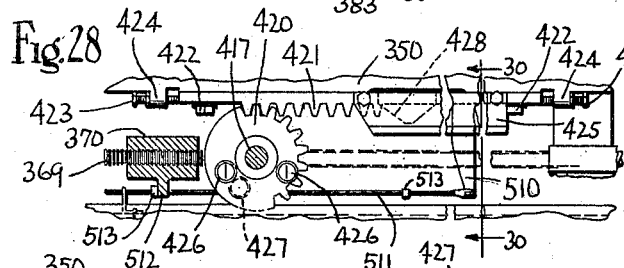
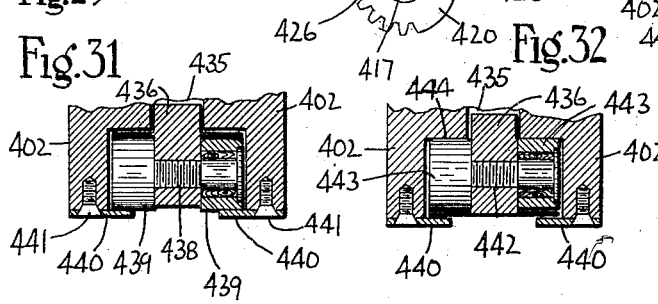
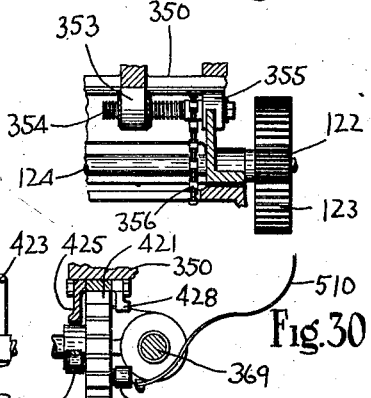
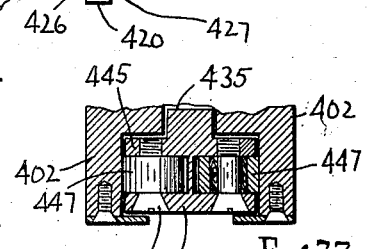
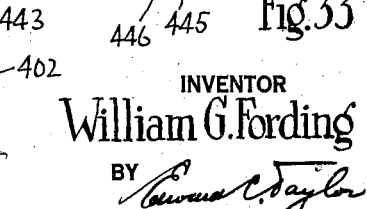
INVENTOR
William G. Fording
BY
ATTORNEY March 8, 1927.
W. G. FORDING
CORD TIRE MACHINE
Filed Jan. 12, 1923
1,620,092
19 Sheets-Sheet 10
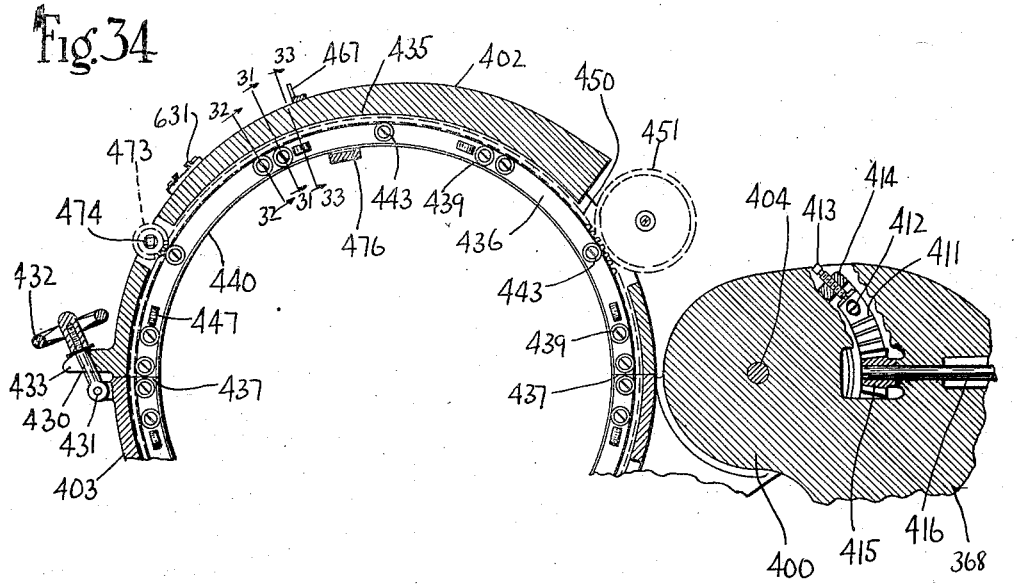
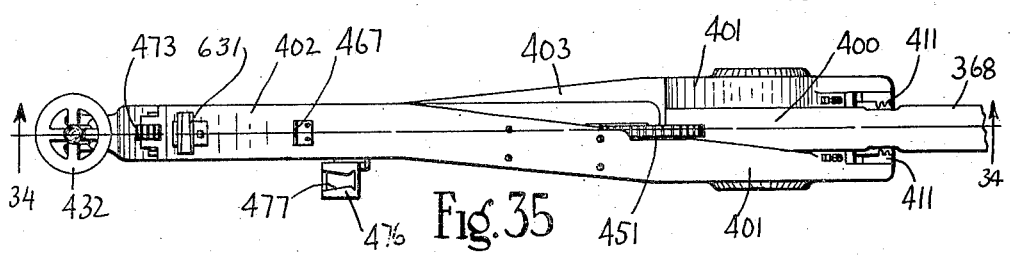
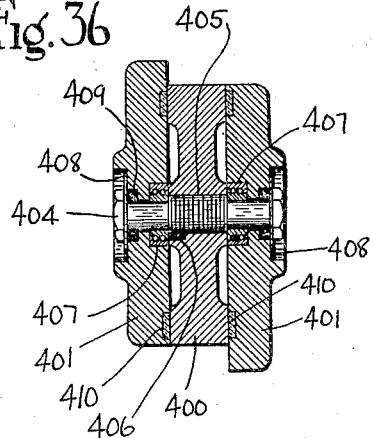
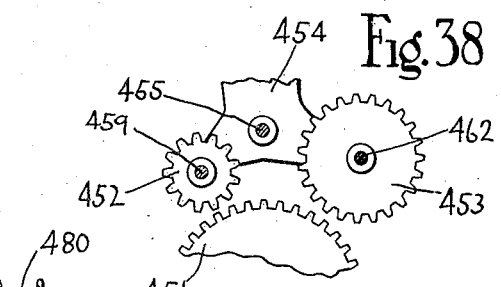
INVENTOR
William G. Fording
BY
ATTORNEY March 8, 1927. 1,620,092
W. G. FORDING
CORD TIRE MACHINE
Filed Jan. 12, 1923   19 Sheets-Sheet 11
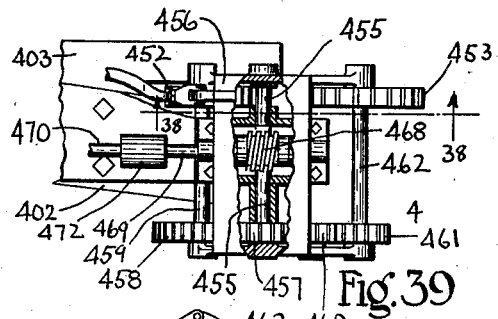
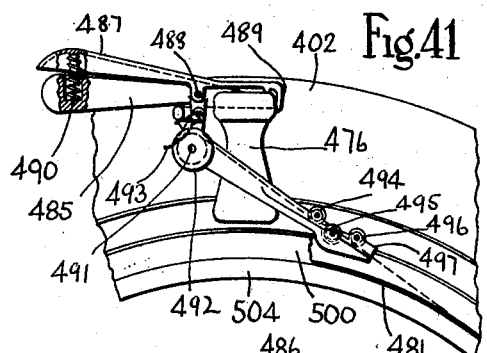
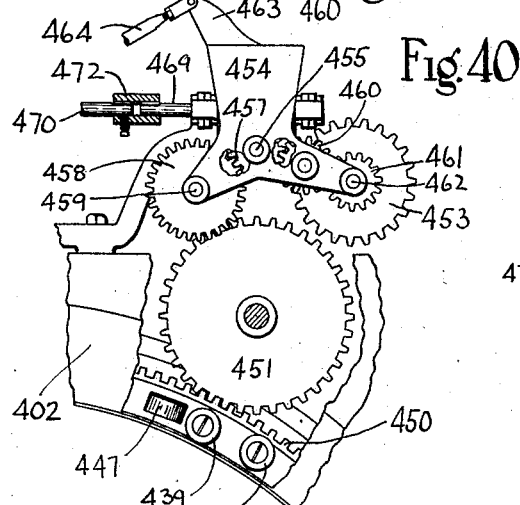
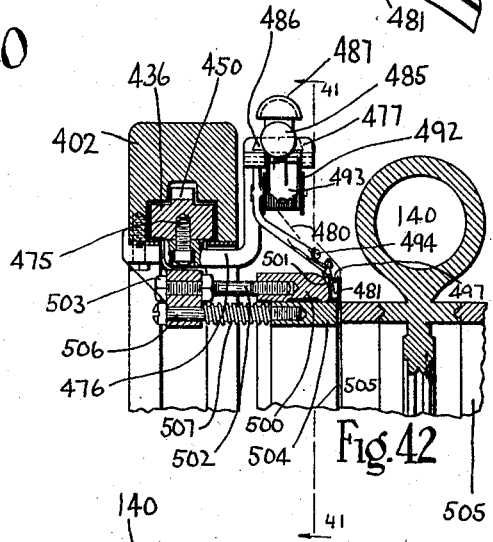
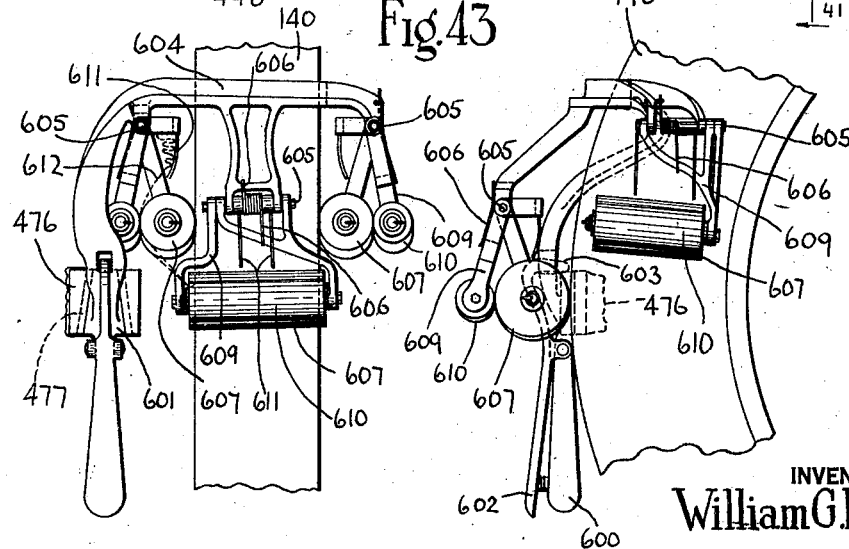
INVENTOR
William G. Fording
BY
ATTORNEY March 8, 1927.   W. G. FORDING   1,620,092
CORD TIRE MACHINE
Filed Jan. 12, 1923   19 Sheets-Sheet 12

INVENTOR
William G. Fording
BY Edward C. Taylor
ATTORNEY

March 8, 1927.  W. G. FORDING  1,620,092
CORD TIRE MACHINE
Filed Jan. 12, 1923    19 Sheets-Sheet 13

INVENTOR
William G. Fording
BY
ATTORNEY

March 8, 1927.
W. G. FORDING
1,620,092
CORD TIRE MACHINE
Filed Jan. 12, 1923   19 Sheets-Sheet 14
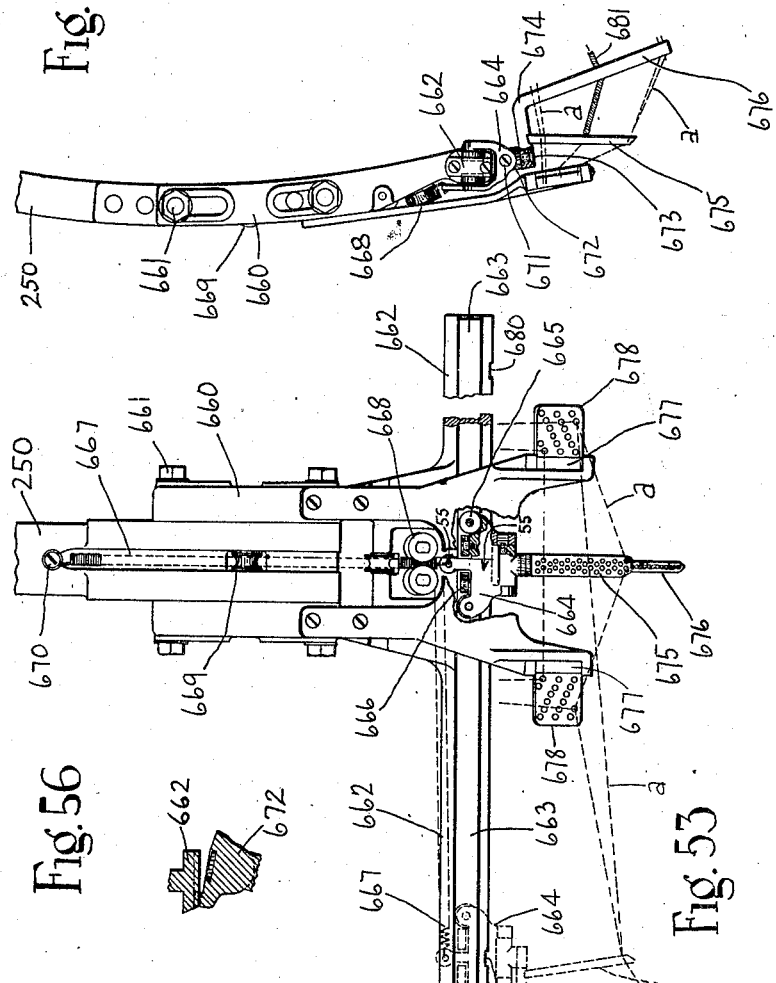
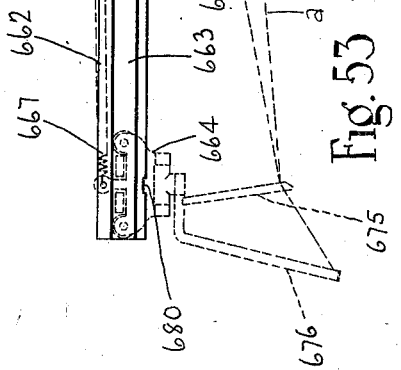
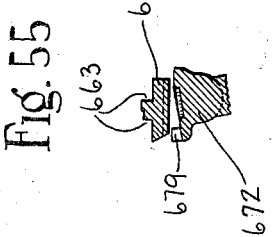
INVENTOR
William G. Fording
BY
ATTORNEY March 8, 1927.  
W. G. FORDING  
CORD TIRE MACHINE  
Filed Jan. 12, 1923   19 Sheets-Sheet 16  
1,620,092

INVENTOR  
William G. Fording  
BY  
ATTORNEY

March 8, 1927.

W. G. FORDING 1,620,092

CORD TIRE MACHINE

Filed Jan. 12, 1923

INVENTOR
William G. Fording
BY
ATTORNEY

Patented Mar. 8, 1927.

1,620,092

UNITED STATES PATENT OFFICE.

WILLIAM G. FORDING, OF CLEVELAND, OHIO.

CORD-TIRE MACHINE.

Application filed January 12, 1923. Serial No. 612,175.

My invention relates to machines for building the carcasses of cord tires, and particularly to machines designed for carrying out the methods set forth in my Patents Nos. 1,422,046 granted July 4, 1922, and 1,423,929 granted July 25, 1922, and constructing tires according to my Patent No. 1,401,148 granted December 27, 1921, reissued July 11, 1922 as No. 15,405.

Among the objects of my invention I may mention the building of tire carcasses in greatly reduced time; the more accurate positioning of the cords of the tire carcass; the building of a tire carcass with the cords under uniform and balanced tensions; the improvement of mechanism for applying the bead reinforcements; and the improvement of the construction of the carcasses in various other ways which will appear from the following description and claims. Other objects will appear from the patents above referred to.

Before describing the machine in detail, reference may be made to the manner of its operation. A circumferential series of separate cords or strands is directed in converging relation from a source or sources of supply such as a creel used in warp-handling machinery. These cords are individually guided by movable guides which carry them down the sides of the tire-building support or core. The core is mounted so as to have a motion along its axis, whereby it is passed from one side to the other of the series of guides, and also a motion of rotation about its axis, whereby the cords are laid diagonally upon the core. While the core is at the side of the guides, and the guides in their inward positions holding the cords down the side of the core, a bead applying mechanism closes about the series of cords and winds bead material circumferentially in place. Upon the retraction of the bead mechanism to its inactive position the core and guides resume their motions, the coaction being such that the cords are maintained under tension at all times. The combined result of all these devices is to lay the cord material diagonally back and forth across the core in a plurality of reverse folds, progressing outwardly through successive plies, and having an annular bead anchorage enclosed within each reverse fold. Various other devices used in connection with those mentioned above will be described below.

The invention will now be described in connection with the accompanying drawings, in which—

Fig. 2 is a top plan view thereof;

Fig. 3 is an end elevation, taken from the right in Figs. 1 and 2;

Fig. 4 is a detail of gearing taken on line 4—4 of Fig. 6;

Fig. 5 is a detail of the same gearing, taken on line 5—5 of Fig. 6;

Fig. 6 is a side elevation, on an enlarged scale and partly broken away, of the core support and certain driving mechanism, looking at the opposite side of the machine from Fig. 1;

Fig. 7 is a section on line 7—7 of Fig. 6;

Fig. 8 is a section on line 8—8 of Fig. 7;

Fig. 9 is a detail of certain crank mechanism shown in Fig. 6;

Fig. 10 is a section on line 10—10 of Fig. 9, partly broken away;

Fig. 11 is a section on line 11—11 of Fig. 6;

Fig. 12 is a section on line 12—12 of Fig. 6;

Fig. 13 is a detail of a cord guiding arm;

Fig. 14 is a detail, partly in median section, of the worm drive mechanism for operating the cord arms;

Fig. 15 is a detail, partly broken away, of a few of the circumferential series of cord arms and their operating mechanism;

Fig. 16 is a section on line 16—16 of Fig. 6, illustrating the core supporting spider;

Fig. 17 is a detail of the core supporting shaft;

Fig. 18 is a detail of a cord guiding shuttle;

Fig. 19 is a side view thereof, partly broken away and partly in median section;

Fig. 20 is an end view thereof, taken from the left in Fig. 19;

Fig. 21 is an enlarged section on lines 21—21 of Figs. 19 and 20;

Fig. 22 is a detail, partly in section on line 22—22 of Fig. 13, of one of the cord guiding rollers;

Fig. 23 is an enlarged sectional detail thereof;

Fig. 24 is an enlarged view on line 24—24 of Fig. 1, showing the bead applying devices and a portion of the series of cord arms;

Fig. 25 is an end elevation on line 25—25 of Fig. 24;

Fig. 26 is a section on line 26—26 of Fig. 24;

Fig. 27 is a section on line 27—27 of Fig. 24;

Fig. 28 is a section on line 28—28 of Fig. 25;

Fig. 29 is a partial view of the mechanism shown in Fig. 28, showing another operative position;

Fig. 30 is a section on line 30—30 of Fig. 28;

Fig. 31 is a section on line 31—31 of Fig. 34;

Fig. 32 is a section on line 32—32 of Fig. 34;

Fig. 33 is a section on line 33—33 of Fig. 34;

Fig. 34 is a section on line 34—34 of Fig. 35;

Fig. 35 is a top plan view of one of the bead applying units, the motor and certain gearing being removed;

Fig. 36 is a section on line 36—36 of Fig. 24;

Fig. 37 is a section showing one form of bead construction;

Fig. 38 is a section on line 38—38 of Fig. 39;

Fig. 39 is a top plan view, partly broken away, of certain driving mechanism associated with each bead applying unit;

Fig. 40 is a side elevation thereof, partly broken away;

Fig. 41 is a side view of a tool used for applying the bead cord or wire, taken on line 41—41 of Fig. 42;

Fig. 42 is a section through a bead applying unit and an associated tire building core, illustrating the operation of applying the bead cord or wire;

Fig. 43 is a top view of a tool for applying sheet rubber to a previously laid ply of cords on the tire building core;

Fig. 44 is a side elevation thereof;

Fig. 53 is a detail of a modified form of cord guiding arm;

Fig. 54 is a side elevation thereof;

Fig. 55 is a section on line 55—55 of Fig. 53;

Fig. 56 is a similar section showing the parts in another operative position;

*Main drive (Figs. 1, 2, 3, 4, 5, 6, 24, 25 and 27).*

The power for reciprocating and rotating the core and for operating the cord guiding devices is derived (Figs. 1 and 2) from a motor 100 mounted on a portion of the foundation frame 101 and carrying on its shaft a pinion 102. Suitable electrical controlling devices for this motor may be provided at any convenient point, but need not be illustrated here. Pinion 102 meshes with a gear 103 on a short idler shaft 104

Figure 1:
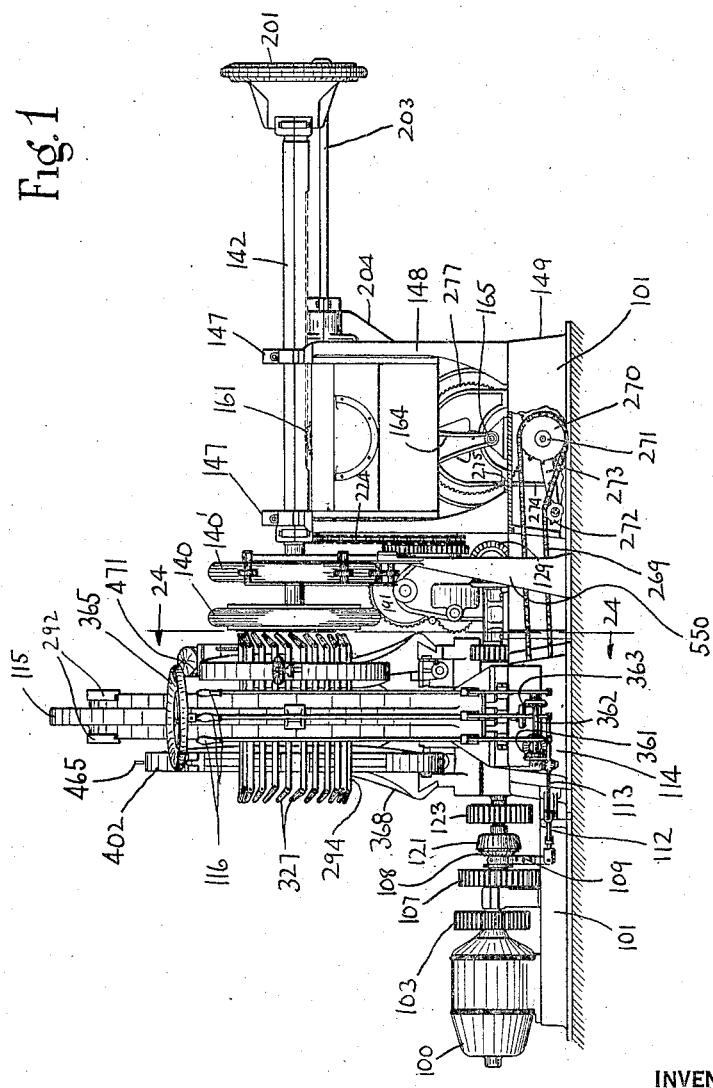
Fig. 1 is a side elevation of a machine embodying the invention.
Figure 45:
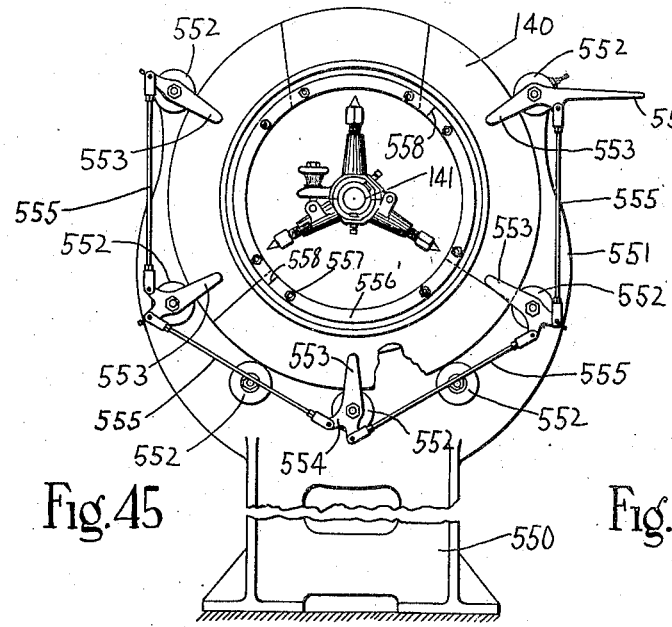
Fig. 45 is an enlarged view taken on line 45—45 of Fig. 2, showing the mechanism for holding a core while it is being mounted around the core supporting shaft.
Figure 46:
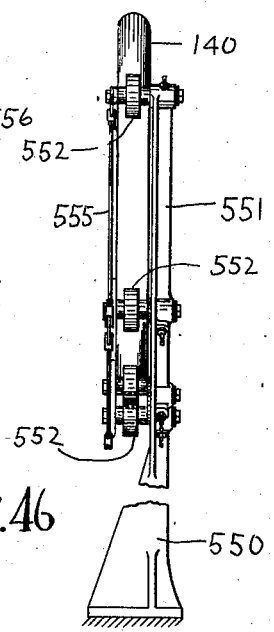
Fig. 46 is a side elevation thereof.

(see also Fig. 25) carrying a pinion 105. This pinion 105 meshes with an idler gear 106 meshing in its turn with a gear 107 on a short shaft to which is splined the movable member 108 of a friction clutch. In order to shift the clutch into and out of operative position, a yoke 109 is pivoted to frame 101 and is connected by a link 110 to one arm of a bell crank 111. A link 112 connects this bell crank to a rocking lever 113 pivoted to the portion 114 of the machine base which supports the annular housing 115 for the cord guiding devices. The other end of this rocking lever is connected by a short link (concealed by other parts in the drawings) with the bottom end of a substantially vertical control lever 116, the central one of three mounted side by side at the control station of the machine (Fig. 1). While the manner of mounting this particular lever 116 does not appear in the drawings, it is identical with the mounting of the other levers of the set, one of which appears in side elevation in Fig. 3. The levers are pivoted upon a bracket 117 attached to the base portion 114, and have a spring 118 pressing a pawl 119 into a notch in a stationary segment 120. The notches are suitably placed in each of the three lever assemblies to hold the levers releasably in their inoperative positions, the pawls, however, being easily released from their respective notches by the operator pulling upon the lever.

Returning now to the friction clutch controlled through the foregoing mechanism by lever 116, the outer or non-slidable part 121 (Figs. 1 and 2) of the clutch is carried on a sleeve surrounding the shaft upon which the movable clutch member slides. This sleeve carries at its other end a pinion 122 meshing with a gear 123 on one end of a shaft 124 (Figs. 4 and 24) upon the other end of which is a gear 125 meshing with a gear 126 upon a short shaft 127 (Figs. 4 and 5) carrying a bevel gear 128 meshing with a second bevel gear 129 on a shaft 130. This latter shaft can conveniently be taken as a base from which a description of the core and cord guiding drive mechanisms may be started, and the main drive will therefore be considered as stopping at this point. It will be seen that the mechanism described serves to convey power from the motor 100 to the shaft 130, under the control of the operator at all times by means of the central lever 116, and through suitable reduction gearing so that the high rotative speed of the motor is converted into a speed suitable for operating the several motions deriving their power from shaft 130.

*Core reciprocating drive (Figs. 1, 2, 3, 4, 5, 6, 9, 10, 11, 12, 57, 58, 59, 60, and 61).*

The tire building support, which in this instance is shown as a ring core 140, is mounted in a manner to be later described upon a shaft 141, extending through a diagonally mounted hollow square shaft composed of mating sections 142 and 143 (Fig. 12). At the ends of the square shaft, the shaft 141 is preferably journaled in ball bearings indicated by 144 in Figs. 6 and 11, the outer ball races being clamped in enlargements of the opposed halves of the square shaft, and the inner race fitting upon raised and shouldered portions 145 of the shaft 141. This serves to permit rotation of round shaft 141 within the square shaft, but to constrain them for reciprocation together. Bolts 146 serve to clamp the sections of the square shaft firmly together. The square shaft is mounted to slide through guides 147 on an overhanging standard 148 supported on a portion 149 of the machine base.

The construction of these guides is shown in detail in Fig. 12. The standard 148 is recessed and shaped at each guide to provide bearing for rollers 150 and 151, and a cap 152, connected to the standard by studs 153, is shaped to provide bearing for a roller 154. As shown in the latter case, the rollers are preferably journaled on anti-friction bearings 155 mounted on rods 156 held in place by set screws 157. By this means the square shaft is allowed to move longitudinally with a minimum of friction, and yet be restrained from rotation. The reciprocative movement of the core is obtained through this square shaft, which carries with it in its movements the round shaft 141, rotative movement being given to the core through the latter.

The mechanism for reciprocating the core will now be described. Upon the lower edge of the square shaft is a rack 160 (Fig. 6), with which meshes a gear 161 fixed to a shaft 162 journaled in the standard 148. To shaft 162 is also fixed a pinion 163 which is oscillated to and fro by a segment 164 pivoted at 165 (Fig. 1) to the base. This segment is given a motion of a nature which will appear more fully below, by a crank 166 carried by a shaft 167. The end of the crank and the manner in which it operates upon the segment are illustrated in detail in Figs. 9 and 10. The crank has parallel radial guideways 168 between which is mounted a block 169 of rhombic shape, and transverse guideways between which and the block are located wedge pieces 170. Screws 171, attached to the crank and abutting against the ends of the wedge pieces, serve to adjust the latter transversely and hence to shift the block towards or away from the center of the crank. The effect of this arrangement is to provide an adjustment for changing the effective length of the crank and hence governing the total reciprocative travel of the core. Through block 169 passes a pin 172, between a shoulder 173 (Fig. 10) on which and a flanged nut 174 the block 169 is freely clamped. The other end of the pin is threaded to receive a flanged nut 175, conveniently pinned to the pin as at 176 to prevent the nut coming unfastened. Between this second nut 175 and the flange 173 is located a two-part square bearing adapted to rotate upon the pin and to slide in a slot 177 in the segment 164. The two parts 178 and 179 of the bearing have an interfitting connection to keep them in alignment, and flanges 180 to provide bearing on the sides of the slot.

The shaft 167 upon which the crank 166 is mounted has fixed thereon (Fig. 6) a pinion 181 meshing with a rack 182 sliding in guideways 183. A connecting rod 184 couples the rack to a crank 185 carried by a shaft 186. This crank is preferably made adjustable in a similar manner to crank 166 previously described, so that the total throw of crank 185 may be varied as desired.

The nature of the reciprocation imparted to the core may now be considered, although the reasons why this type of motion is desired are better deferred until after the remainder of the mechanism has been described. The core is given a continuous reciprocation from one side to the other of the central annulus as indicated by the difference in its position in Figs. 57 and 61. After reaching the limit of its travel at either end of the main through stroke (that end shown in Fig. 57 will be taken as an example), it has a short motion towards the center of the machine (Fig. 58). After this short motion it returns to the extreme position (Fig. 59), after which it starts its continuous travel through the annulus to the other end of its travel. This motion may be briefly summarized as alternate movements from one end to the other of its major stroke, with a short minor reciprocation interjected at each end of the major stroke.

These minor reciprocations are, by the mechanism described, accomplished without any reversal of direction of crank 185, which continues a steady revolution in one direction as long as the main drive clutch is held engaged by handle 116, but by what may be termed an overtravel of crank 166. From a study of Fig. 57 it will appear that crank 166 lies in a position giving the maximum displacement of the segment 164, i. e., where the center lines of the crank and segment form right angles with each other. Crank 185, on the other hand, has not yet produced the maximum displacement of rack 182 and consequently of crank 166. Fig. 58 shows the parts when crank 185 has reached the position giving maximum displacement to rack 182. In this position the crank 166 has overtraveled its position at right angles to the center line of the segment, and has therefore drawn the segment slightly towards its central position. The resulting change in position of the core is indicated by the relative positions of the core in Figs. 57 and 58. As the crank 185 proceeds in its revolution the rack 182, and therefore crank 166, are brought again to a position giving maximum displacement of the core (Fig. 59), further rotation of the crank 185 moving the core through the annulus to the positions of Figs. 60 and 61. It will be apparent from the above that adjustment of crank 185 will have no effect upon the maximum displacement of the core, which is entirely governed by the adjustment of crank 166. The amount by which crank 166 is caused to overtravel, and consequently the length of the minor reciprocation of the core, is governed by the adjustment of crank 185.

Shaft 186, upon which crank 185 is mounted for continuous rotation, is supported in a bracket 190, and carries (Figs. 4, 5, and 6) a gear 191 meshing with an idler gear 192 also journaled in the bracket. Gear 192 meshes with a gear 193, mounted upon a shaft 194 and meshing with a pinion 195 (Fig. 6) upon the shaft 130 previously mentioned as carrying bevel gear 129.

*Core rotating drive (Figs. 1, 2, 3, 4, 5, 6, 7, and 8).*

Keyed to the end of shaft 141 remote from that upon which the core 140 is mounted is a gear 200 (Fig. 6), revolving within a housing 201 secured to the square shaft. Journaled in the housing is a pinion 202 meshing with the gear 200 and secured to a squared shaft 203 extending longitudinally of the machine. This shaft serves to furnish a driving connection for the core rotating pinion in whatever longitudinal position it may be due to the reciprocation of the core. The square shaft 203 passes through a housing 204, supported on standard 148 and having fixed within itself the outer races 205 (Fig. 7) of ball bearings, the inner races 206 being fixed to a hollow split hub 207 keyed at 208 to a gear 209. Within the hub 207 are rollers 210 extending in one direction (Fig. 8), and rollers 211 extending in a direction at right angles. These two sets of rollers bear upon the square shaft 203 so that while the latter is free to move endwise within a minimum of friction it will be constrained to rotate with gear 209. A convenient manner of supporting the rollers 210 and 211 in the hub 207 is indicated in Fig. 8. Pins 212 pass from side to side of the hub and carry bushings 213 preferably of lignum vitæ, over which the rollers 210 or 211 are freely rotatable. This manner of mounting the rollers avoids the use of oil, which would flow out upon the shaft 203 and might drop upon the cords, some of which, as will appear later, are delivered to the machine in sheet assembly at a point immediately below the overhanging standard 148. Set screws 214 serve to hold pins 212 in place.

Also journaled in the housing 204 is one end of a shaft 220, keyed to which is a pinion 221 meshing with gear 209. The other end of this shaft is suitably journaled at 222 on the standard 148 (Figs. 2 and 6), and carries a sprocket 223 (Fig. 2) connected by a chain 224 to a sprocket 225 on a stub shaft 226 (Fig. 5) mounted in bracket 190. Fixed to this stub shaft is an elliptical gear 227 meshing with a similar elliptical gear 228 on a lower shaft 229 driven through bevel gears 230 from a shaft 231 carrying gear 192 previously referred to. These elliptical gears are used to vary the rate at which the core revolves at different points in its reciprocation, in order that the proper angular position of the cords on the core will be given at all points. Due to the varying positions of the parts the core should, in order to keep the same cord angle on its sides as on its crest rotate faster near the center of its stroke than at the ends. For this reason the eccentric gears are set so that with the core at the center of its stroke the long radius of the driving gear is working on the short radius of the driven gear.

*Cord guiding devices (Figs. 1, 2, 3, 4, 5, 6, 13, 14, 15, 18, 19, 20, 21, 22, 23, 24, 62, and 69).*

The cord guiding devices of the present machine, in distinction to any previous devices of which I am aware, are designed to handle a circumferential series of cords by positively carrying the separately guided cords down the sides of the building core. The cord guiding apparatus which performs this function is composed of a series of pivoted arms, each adapted to guide a group of separate cords, and swinging from a point outside the path of travel of the core to a point within the bead circumference thereof. The substantially radial motion of the cord guiding devices combines with the rotation and reciprocation of the core to cause the cords to be carried over the crest of the core in the proper relation desired in the completed carcass.

The cord guiding devices are mounted in the annular housing 115 which is located centrally of the path of the core, and through which the core is reciprocated. Each cord guiding device is supported by a bell crank 250 (Figs. 13, 15, 62, and 69), pivoted at 251 (Figs. 13 and 15) to the housing, and having one arm formed as a toothed sector 252 meshing with a large internal ring gear 253 journaled in the annular housing. The pivots of the bell cranks are preferably fitted with lignum vitæ bushings 254 (Fig. 13) to obviate the use of oil, which in this position might drop upon the cords.

Secured to the ring gear 253, as by screws 255 (Fig. 14), is a toothed segment 256 meshing with a worm 257, preferably adjustably mounted on a shaft 258 as will now be described. The shaft 258 passes through bushings 259 fitting between the housing 115 and a lubricant-retaining cap 260, one of the bushings being adjustable endwise to absorb wear by adjusting screws 261. The worm itself is splined at 262 to the shaft, and is free to slide upon the shaft except as restrained by opposed collars 263 screwed to the shaft at 264 and provided with set screws 265 to hold them in adjusted position. Holes 266 serve for the attachment of a suitable spanner wrench by which the collars may be adjusted and tightened. Anti-friction and spacing washers 267 are located between the collars 263 and the flanged ends of the bushings 259. By this arrangement the worm can be suitably adjusted to mesh with the segment, and compensation made for wear as desired.

Shaft 258 carries at its end a sprocket 268 (Figs. 15 and 24), connected by a chain 269 (Fig. 1) with a sprocket 270 on a shaft 271 (Figs. 1 and 6) extending across the standard 148 under shaft 162 previously referred to. The lower reach of the chain preferably passes over a tightening sprocket 272 rotating idly on the end of a lever 273 pivoted to shaft 271 and having an adjustment rod 274 with a nut 275 thereon fitting against a ledge on the base 149, whereby the idler sprocket can be shifted to prevent slackness in the chain. Also secured to shaft 271 is a pinion 276 (Fig. 6) meshing with a gear 277 fixed to a shaft 278 suitably journaled in the standard 148. A pinion 279, also attached to this latter shaft, meshes with a rack 280 similar to rack 182 but situated below it. Rack 280 is reciprocated by means of a crank 281 and a connecting rod 282 from the shaft 194 previously referred to in connection with the drive for crank shaft 186. The size of the gearing (191, 192 and 193) connecting shafts 186 and 194 is so chosen that shaft 194 revolves twice as fast as shaft 186. This is for the purpose of causing the cord carrying arms to be swung into their inner position twice during a complete cycle of reciprocation of the core, and therefore to carry the cords down both sides of the core. This will more clearly appear from the description of the operation of the machine.

The cords extend from a suitable source of supply in four series, the lower two series lying parallel to the floor and extending into the undercut 290 (Fig. 3) formed in the standard 148. A false flooring, indicated by 291 in Fig. 3, is preferably provided to permit the operator to walk over these layers. The four series are directed to four guides 292, consisting conveniently of long bars drilled to receive the cords and preserve them in spaced parallel relation, one guide being secured at the top and one at the bottom of each side of the annular housing 115. From these guides the cords extend through drilled guide plates 293 (Fig. 13) fastened to the cord arms 250. One plate is secured to each side of the cord arm to receive the cords from the guide bar 292 on its side of the housing. Each cord arm is bifurcated as shown in Fig. 13, the branches 294 extending laterally for a purpose to be described. From the guide plates 293 the two series of cords are joined at centrally located swinging and pivoted shuttles, one of which is attached to each cord arm. Before describing these shuttles in detail, it may be stated that the cords are so arranged as to pass in as straight lines as possible, and therefore, the cords passing through the guide plates 293 attached to one cord arm will in general pass through a shuttle attached to another cord arm.

Each cord arm (Figs. 18 and 19) is formed with a recess 300 in which is positioned a ball race 301. A cooperating ball race 302, between which and the first are located anti-friction balls, 303, is carried by an arm 304 having a central recess 305 within which is located a smaller ball race 306. On a stud 307 fastened to the cord arm is adjustably mounted, as by a nut 308, a race 309, between which and race 306 is located a second series of balls. Felt packings 310 and 311 are provided for the two ball bearings to prevent escape of grease. By this means the arm 304 is free to swing from side to side as required by the shifting positions of the cords as they are carried to and fro by the reciprocation of the core.

Each arm 304 is apertured at 315 to receive a spindle 316, to which the shuttle 317 is attached as by a stud 318. The spindle is supported at its ends by ball bearings 319 and 320 of a type common in axle or spindle construction and unnecessary to describe in detail here, although illustrated in Fig. 19. The shuttle itself has a body portion 321 having on each face ribs 322 forming between them guiding grooves in which the cords $a$ lie. The grooves converge in the direction which is to face towards the core, so that the separated cords are brought nearer together and more nearly into a continuous sheath. On each side of the shuttle is fastened by a bolt 323 and a bridgepiece 324 a spring comb 325, the fingers 326 of which extend into the grooves in the shuttle to exert the desired tension on the cords. This is perhaps best shown in Fig. 21, which illustrates the cords in position.

After the cords leave the shuttles they pass directly to the core. At certain times in the operation, however, the cords are positively pressed towards the axis of the core, and below the bead supporting flanges thereof, by a series of rollers 327 carried by the branches 294 of the cord arm. These rollers, as indicated by the group shown in Fig. 15, form together a complete circle when the cord arms are in their inner positions, adjacent rollers overlapping slightly on account of their angular position so that no possibility is left for the cords to slip between the rollers. The cords that are held by any one roller are not necessarily guided by the shuttle attached to the same cord arm as that roller, the point from which the cords come making no difference in the guiding function of the rollers.

Each roller is preferably hollow (Fig. 22) and screwed at 328 to a sleeve 329 (a screwdriver slot 330 being conveniently formed in the end of the roller for that purpose). Sleeve 329 is carried by ball bearings 331 and 332 upon a spindle 333 which is bolted to the branch 294 of the cord arm, a pin and slot connection 334 serving to maintain the spindle in position. By this means the roller is free to turn under the influence of the cords. The outside surface of the roller is preferably grooved as at 335 (Figs. 22 and 23), to keep the cords separate and in proper parallel relation.

*Bead forming devices (Figs. 1, 2, 3, 24 to 42 inclusive, 64, and 65).*

Figure 64:
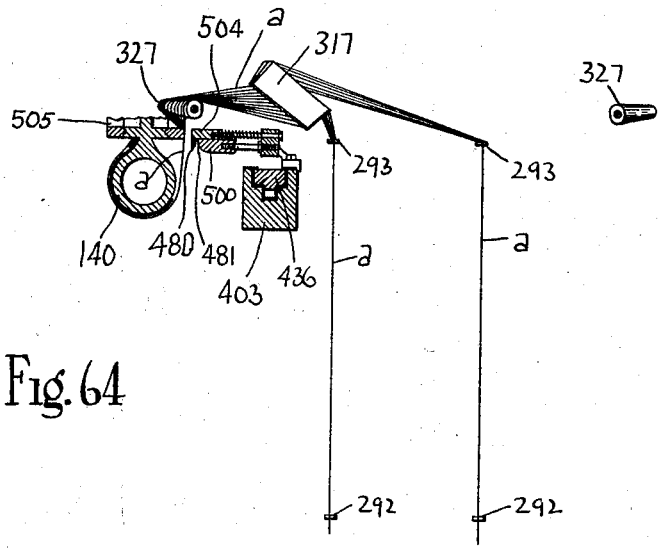
Fig. 64 is a similar view illustrating the position of the cords prior to the application of the bead.

The above described mechanism operates in a manner to be discussed more fully later to carry the circumferential sheath of cords across the core in successive reverse folds. The core passes alternately from one side to the other of the annular housing which supports the cord guiding arms. At each extreme of the stroke the cord guiding arms move inwardly, carrying the cords below the bead line of the core and holding them close under the bead positioning flanges 505 of the core by rollers 327 (Fig. 64). During this period, while the mechanism thus far described remains out of operation and the cords are resting in place down the side of the core, the bead forming mechanism comes into play, serving to wind about the sheath of cords a plurality of turns of threads or wires forming an anchorage for the cords and permitting their being folded back across the core to form another layer. Briefly described, this mechanism—which is in independently operable duplicates, one at each side of the housing 115—comprises in each instance an annular trackway, opening and closing like a clam shell bucket to surround the series of cords, and shuttle mechanism traveling in the trackway around the cord sheath. A description of one of the two duplicate mechanisms will suffice for both.

Both of these bead forming mechanisms are carried on a bed 350 (Figs. 24 and 25)

mounted to be moved parallel to the axis of the core and the cord guiding annulus. This bed has a dovetailed slideway 351 (Fig. 24) running on a guide 352 forming a part of the foundation frame 101. To the bed 350 is secured (Fig. 27) a depending ear 353 through which is threaded a shaft 354 longitudinally fixed but rotatable in a bearing 355 secured to the frame. A chain 356 passes over a sprocket on shaft 354 and over a sprocket 357 (Fig. 25) on a cross shaft 358 journaled in bearings on either side of the frame. Shaft 358 has a mitre gear connection 359 with a shaft 360 (Fig. 24) running across the machine to the control side and having a mitre gear connection 361 (Fig. 1) with a short cross shaft 362 having in turn a mitre gear connection 363 with the upright shaft 364 (Fig. 3) of a handwheel 365. By rotating this handwheel, which is located in convenient relation to the other control levers, the bed 350 can be moved one way or the other for a purpose to be described.

Bed 350 is itself formed with a pair of guides 366 (Fig. 25) at right angles to guide 352, one of which serves for each bead mechanism. Each mechanism is mounted on slideways 367 (Figs. 25 and 26) fitting upon the guides 366 and forming a support for the bracket 368 upon which the bead mechanism proper is carried. Extending longitudinally of each slide is a shaft 369, threaded into a depending ear 370 attached to the bottom of the bracket 368 (Fig. 24 and the right hand side of Fig. 26), and carrying at its outer end (Figs. 24 and 25) a pinion 371. It may be noted here that the apparent difference in construction between the two sides of Fig. 26 results from the two bead mechanisms being shown in different positions (Figs. 2 and 24). Shafts 369 are suitably journaled on bed 350.

Each pinion 371 meshes with a gear 372 fixed upon a shaft (hidden by other parts in the drawing) journaled in brackets 373 and 374 attached to the bed (Fig. 24) and having splined thereto, according to usual cone clutch construction, the central member 375 of a double cone clutch. A gear 376, which is secured to an outer clutch member 377 rotatable freely upon the clutch shaft, meshes with a gear 378 which in turn meshes with a gear 379 (Fig. 25) fixed on a shaft 380 journaled in brackets 373 and 374 common to the two bead mechanisms. The second outer clutch member 381, also freely rotatable on the clutch shaft, has affixed thereto a gear 382 (Fig. 26) meshing directly with a gear 383 on the common shaft 380. To the end of shaft 380 is secured a bevel gear 384 (Fig. 24) meshing with a similar gear 385 on a cross shaft 386 having at its end (Fig. 25) a wide gear 387 meshing at all points within the range of adjustment of bed 350 with a gear 388 on shaft 104, which is the idler shaft previously referred to in describing the main drive.

Each of the clutches (there being one for each bead mechanism) is operated by a yoke 390 pivoted at 391 to bracket 374, and having a slot in which fits a pin 392 forming part of a clutch shifting ring set in a groove in the central clutch member, as is usual in cone clutches and accordingly needs no detailed description here. To the bottom of the yoke is pivoted a link 393, pivoted in turn to a rocking lever 394 connected with a rod 395 running through the foundation frame and connected to the bottom of one of the outer of the three upright rocking levers 116 described previously in considering the main drive. Link 393 is preferably connected to levers 390 and 394 by swivels 396, to permit of the lateral adjustments of the bead mechanisms by handwheel 365. The central one of these three levers operates the main clutch, and each of the two outer levers operates the clutch associated with that bead mechanism at the side of the annular housing 115 at which the particular lever is mounted. Each of the outer levers serves to control the upper slide of the bead mechanism, and to cause the bead mechanism to travel towards or away from the center of the machine as the lever is moved one way or the other from its central or inactive position.

Motion of one of these levers in one direction as if, for example, it is pulled in a direction away from the annular housing, will cause the central clutch member 375 connected thereto to be forced into contact with the clutch member 377. Motion of the lever in the other direction will cause the central clutch member to engage clutch member 381. This latter member is connected to common shaft 380 through one less gear than is the case with member 377 (compare Figs. 25 and 26) and therefore the direction of motion imparted to shaft 380, and consequently to the corresponding bead mechanism supporting bracket 368 which is reciprocated therefrom through threaded shaft 369 and ear 370, will be in the opposite direction. By this mechanism either of the bead forming mechanisms can be moved into operative position or back to inoperative position. As will be described below, each bead forming mechanism is provided with devices adapted to cause it to close around the sheath of cords when moving to operative position, and to open out to clear the sheath when it starts its return to inoperative position.

The top of the bracket 368 is provided with an overhanging circular head 400 (Figs. 34, 35 and 36) forming a bearing for circular bearing portions 401 of the upper and lower clam-shell segments 402 and 403. These bearing portions are offset from the body of the rings, as shown in Fig. 35, so that the rings are in vertical registration with each other while the bearings lie on opposite sides of head 400. A bolt 404 passes through the center of the head 400, and is attached thereto by threads 405 and a pin 406. Suitable ball bearings 407 are mounted on the bolt and serve to give support to the bearings 401. A washer 408 at each end both holds the bearings in place and positions a felt washer 409 preventing the lubricant from leaking out. Adjacent the outer periphery of the bearings and head are rings 410 of anti-friction material. By this means the clam-shell segments are held to the bracket 368 in a manner permitting them to open and close as desired.

Attached to each of the bearings 401 is a segmental bevel gear 411 (Figs. 24 and 34) secured in place by screws 412 passing through slots in the bevel gears, and adjustable by means of set screws 413 passing through ears 414 on the bearings. Fig. 34 is broken away sufficiently to show the upper only of the two set screws, but it will be understood that there is one at each end of each segmental gear (Fig. 24). Fitting between the segmental gears and meshing with both of them is a bevel pinion 415 mounted on a shaft 416 journaled in the bracket 368. The other end of this shaft has bevel gear connection 416 (Fig. 24) with a vertical shaft 417 also journaled in bracket 368. Rotation of this shaft will cause the clam-shell segments to open or close, as bevel pinion 415, which is between the segmental gears 411, rotates them simultaneously in opposite directions.

The mechanism for rotating shaft 417 is so arranged that the motion given to it occurs near the inner end of the reciprocation of the bracket 368 to or from the operative positions. The effect of this is to open or close the clam shells while they are substantially in encircling relation with the cord sheath, and to carry them in open position the rest of their reciprocation. To accomplish these results a disk 420 (Figs. 28, 29, and 30) is fixed to the bottom of shaft 417, having teeth upon a portion of its periphery. Cooperating with the segmental gear thus formed is a stationary rack 321 fixed to bed 350 by bolts 422, and adjustable lengthwise on loosening the bolts by set screws 423 passing through ears 424 on the bead. Attached to the rack is a plate 425 having an outer bearing surface against which rollers 426 affixed to disk 420 are adapted to contact. These rollers prevent rotation of the disk after its gear teeth have left the rack. As a means of insuring that the gear and rack will mesh properly, a roller 427, on the other side of the disk from rollers 426, contacts with a beveled plate 428 also attached to the rack. When the disk is being moved towards the left in Fig. 29, this roller will strike plate 428 and rotate the disk sufficiently to cause the gear teeth on the disk to be brought into proper mesh with the teeth on the rack.

By this mechanism the clam-shell segments 402 and 403 are opened and closed during their motion to and from operating position. The two positions are illustrated by the two bead applying devices shown in Fig. 24, the one at the left being shown in position adapted to encircle the cord sheath, and the one at the right in its outer or inactive position. In order to firmly join the ends of the clam shells when they are closed, one of the rings is provided with a stud 430 (Fig. 24) pivoted at 431 to clam shell 403, and having threaded to it a handwheel 432. On the other clam shell is a slotted horn 433, upon the upper surface of which the handwheel is adapted to rest. By swinging the handwheel into the full line position of Fig. 24 and rotating it to draw the ring halves together, the rings can be clamped so that the shuttle which they guide may rotate as if the rings were a single piece.

The inner periphery of the rings are channeled at 435 to receive a shuttle ring 436, split at two places as indicated at 437 to permit it to open with the clam shell rings. Pivoted to this ring at intervals by studs 438 are rollers 439 (Fig. 31) bearing on strips 440 extending around the inner periphery of the rings and secured in place by screws 441. Also pivoted to the ring by studs 442 (Fig. 32) are rollers 443 engaging a shoulder 444 formed by an enlargement of recess 435. These two sets of rollers furnish bearing permitting easy rotation of the shuttle ring. To guide the shuttle ring sideways, it is provided at intervals with recesses forming ears 445 (Fig. 33) between which a screw 446 serves as a journal for rollers 447, disposed at right angles to the rollers previously described, and bearing against the sides of the enlarged portion of recess 435.

Around the outer periphery of the split shuttle ring 436 are teeth 450 (Figs. 34 and 40), forming in effect a large gear. Meshing with this gear is a gear 451, shown particularly in Figs. 34, 38, and 40. The latter gear receives motion, in either one direction or the other and at different speeds to facilitate various operations which will be described, from either of two gears 452 or 453 mounted in a swinging frame 454. The frame 454 is pivoted on a shaft 455 journaled in a bracket 456. This shaft has fixed to it a pinion 457, meshing both with a gear 458 on a shaft 459 and with an idler gear 460 meshing with a gear 461 on shaft 462. Shaft 459 carries at its other end gear 452 previously mentioned, and shaft 462 similarly carries gear 453. By rocking the frame 454, either of gears 452 or 453 can be brought into mesh with gear 451.

In order to rock this frame it is supplied at its top with a bracket 463 having pivoted to it a link 464 (Figs. 24 and 40). At its other end this link has a handle 465 provided with three notches 466 and fitting in a clip 467 fastened to clam shell 402. With the handle positioned on the central notch the change gear mechanism is in its neutral position, with neither gear 452 nor gear 453 in mesh with gear 451. By shifting the handle to the left, gear 452 can be brought into mesh, and by shifting it to the right, gear 453 will be brought into mesh. Fixed on shaft 455 is a worm gear (hidden by other parts in the drawings) meshing with a worm 468 on a shaft 469 at right angles thereto. This latter shaft is connected to the shaft 470 of a motor 471 by a slip coupling 472 serving to relieve the motor of any end thrust. The motor may be controlled by any desired push button or other switches, conveniently located near the operating levers 116, and unnecessary to illustrate as any usual form may be provided as desired. A pinion 473 is conveniently mounted in clam shell 402, and provided with a square socket 474 for the reception of a socket wrench, so that the shuttle ring can be manually revolved any amount desired.

The shuttle ring has attached to its inner periphery at one point by a bolt 475 (Fig. 42) a tool holder 476, shown in Figs. 35, 41, 42, 43, and 44. The holder is curved outwardly and has its end dovetailed at 477 on a taper (Fig. 43) for the reception of various tools and appliances which are used in constructing the tire. These tools have base portions fitting in the dovetail, and clips which hold them in position, so that the several tools are thus made interchangeable.

As preferably constructed and as described in my Patent No. 1,423,929, the bead reinforcement is formed in sections lying in the reverse folds of the cords at the beginning and end of each complete passage of the cords across the tire. Each of these sections consists in cord or wire 480 (Figs. 37 and 42) wound circumferentially of the bead as many times as necessary to produce the required strength, and preferably lying in trough-shaped annulus 481 of rubber. This trough of rubber serves as a cushion, preventing the wire from cutting or otherwise injuring the cord plies. It is preferably partially cured before being placed in the tire, and is applied either in sections or in a length sufficient to form an endless band when its ends are joined around the series of cords. After this annulus has been positioned, which may conveniently be done by hand, a tool shown in Figs. 41 and 42 is utilized to lay in the trough a coil of cord or wire of the desired number of convolutions.

This tool is carried by a base part 485 having a taper wedge 486 fitting in the dovetail 477 of bracket 476, and having a handle 487 pivoted thereto at 488. The handle carries a latch 489 which snaps over the end of bracket 476 under the influence of a spring 490. Also carried by base 485 is a spindle 491 adapted to receive a spool 492 upon which the wire 480 is furnished. A plate 493, pressed against the spool by a spring, serves the double purpose of exerting tension upon the spool and of fitting between the flanges of the spool to keep the latter upon the spindle. As seen in Fig. 42, the spindle is attached to base 485 only at one end, so that by lifting plate 493 a spool can be removed from or placed upon the spindle. From the spool the wire 480 passes under a roller 494, over a roller 495, and under a roller 496, all mounted on the lower part of base 485. The end 497 of the base is preferably formed of V-shape so as to fit in the trough 481 of rubber and insure registration. With this tool in position on bracket 476, and handle 465 in position to rotate the shuttle ring in the proper direction, the desired number of turns of wire will be laid in the rubber trough which is then moved into position adjacent the side of the core, or of the partially constructed tire thereon, as will be described.

To press the band so formed into place against the core, the axial movement of the bead mechanism described above as operated by handwheel 365 is utilized. Each shuttle ring carries on its side adjacent the core a presser ring 500 (Fig. 42), preferably having a curved outside surface. This ring is attached to the shuttle ring by bolts 502 secured by nuts 503, affording opportunity for axial adjustment. Within the presser ring is a ring 504 serving to clamp the cords against a flange 505 attached to the side of the core, and to present, together with that flange, an annular surface upon which the bead may be constructed. This ring is mounted on bolts 506 slidable through the shuttle rings, and carrying springs 507, whereby the ring may remain pressed yieldably against flange 505 while the presser ring is being forced over the flange. The operation of this mechanism is illustrated diagrammatically in Figs. 64 and 65, and will be considered later.

An automatic trip is preferably employed to stop each bead mechanism at each end of its reciprocation from operative to inoperative position. As shown, this strip operates on the yoke 390 which, as previously described, was operated by one of levers 116 to throw clutch member 375 into position to drive the feed screw 369 in one direction or the other. The yoke has an extension 510 (Figs. 24, 28, and 30) pivoted at its end to a rod 511 (Fig. 28) extending through a lug 512 on ear 370 attached to the bottom of brackets 368, as previously described. Stop collars 513, preferably constructed of a pair of nuts threaded on the rod as to be adjustable to vary the length of stroke, are operated by lug 512 so as to shift the rod, and consequently the clutch member, at each end of the stroke. The motion of the slide will thus itself throw the clutch to its neutral position when it reaches the end of the stroke. In describing the manual main clutch operating means, it was stated that the notches in which detent 119 fell to hold the clutch levers in position were so shaped that they could be released by a pull on the levers. The pull exerted by the automatic trip is sufficient for this, the lever being swung from a position with the detent in an end notch to where it falls into the central notch.

*The transfer operation (Figs. 1, 2, 16, 17, 45, 46, 47, 65, 66, and 68).*

After a tire carcass has been constructed by the operation of the mechanism previously described, it is necessary to sever the cords from it and to place them in position to start the building of a succeeding carcass. As the number of separate cords is so great that it would take a great amount of time to handle them individually after the completion of each carcass, I prefer to start the building of the succeeding carcass before the cords have been severed from that just constructed, and to sever the cords from the first carcass only after they are securely attached in the second. The method of so transferring the cords is described and claimed in my Patent No. 1,422,046, dated July 4, 1922. According to that method the cords are drawn over the crests of the two cores while these are located coaxially with each other and close together, and the series of cords then severed on a circumferential line between the cores. The free ends of the cords thus cut are laid over the core, in the case of the carcass whose construction is just being started, or over the previously laid plies, in the case of the built-up carcass, and form preferably an additional reinforcement lying across the crest of the carcass either at the inside or outside as the case may be. A tire having a reinforcement of this nature is claimed in my reissued Letters Patent No. 15,405, dated July 11, 1922.

Referring for a moment to the assembly shown in Fig. 1, which is a view of the machine from the operator's side, the fresh core is placed upon shaft 141 at a point to the right of the core upon which the carcass has just been completed, as indicated at 140'. As the cores are annular in shape, it is necessary in positioning the core in this location to open it up so that it may be closed around the shaft, as the first core prevents the fresh one being slipped over the end of the shaft. The cores customarily employed in the manufacture of tires having inextensible edges are made sectional, so that they may be collapsed if desired, and I prefer to use a core of the standard type. On account of the weight of the cores, however, I have provided a supporting cradle shown in Figs. 45 and 46 which serves to support the sections of the core and permit them to be assembled around the shaft and secured thereto. This cradle is supported on a frame 550 (see also Fig. 1). A yoke 551, forming part of the frame, carries a series of rollers 552 suitably spaced so that the assembled core will lie tangent to all of them. These rollers are smooth surfaced, so that the core can slide off them after it has been assembled. In order to temporarily hold the core sections in alignment with each other, certain of the rollers are provided with positioning yokes 553 pivoted to the shafts of the rollers and provided with extensions 554 connected together by links 555. By a handle 556 on the positioning yoke at one end of the series, the whole series of yokes can be swung into or out of position to hold the core sections in place. The yokes are so shaped as to embrace the crest and sides of the sections, and give them lateral support while the operator is assembling and securing them. The core sections themselves are shown as held together by rings 556' and bolts 557, the rings being split as at 558 to enable them to be placed around shaft 141.

The spiders for holding the cores on shaft 141 are also made so that they can be applied around the shaft. The construction which I have designed for this purpose is shown in Fig. 16. The body of the spider is made in two parts, one part 560 carrying two projections 561 and the other part 562 a third similar one. Into these projections are screwed the spider arms 563 which support the inner periphery of the core in a known manner. The two parts of the spider are pivoted together at 564, so that one of them may be swung as indicated in dotted lines in Fig. 16 to permit the spider being placed on or removed from the shaft. Upon part 560 is a split lug 565 between the arms of which is pivoted a screw 566 having a handwheel 567 threaded thereon. Part 562 has a fork 568 into the space of which the screw can move, and upon the side of which the handwheel can bear. The screw and handwheel are shown in dotted lines as disengaged from the fork so as to permit the spider to be removed from the shaft. By swinging the screw to the full line position and tightening the handwheel, the spider can be firmly clamped upon the shaft. The shaft has a key 570 attached to it as by screws 571 (Fig. 17), and the spider has corresponding keyways 572 (Fig. 16) in which the key fits. Preferably a plurality of keyways are provided on the spider so as to permit of the spider being assembled in a desired position irrespective of the angular position of the shaft. Set screws 573 serve to hold the spider firmly in any desired longitudinal position on the shaft.

In assembling the core, a spider is first secured around the shaft with the arms 563 screwed into the spider body so as not to interfere with the assembling of the core. The core sections are then assembled in the cradle and secured to the retaining rings 556, yokes 553 meanwhile being in position to support the core sections. After the core has been thus assembled, the spider arms are properly adjusted to grip and center the core by its inner periphery, and yokes 553 swung out of the way. The core is now ready for the transfer.

Figure 47:
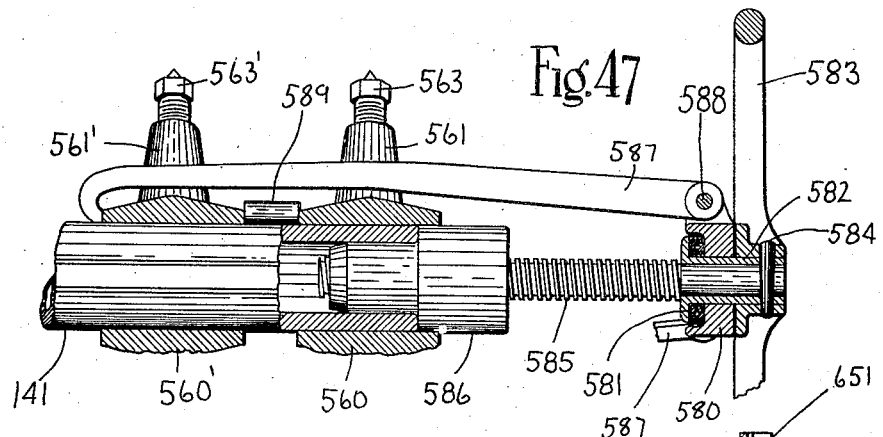
Fig. 47 is a detail showing the application of a tool for shifting the cores along the supporting shaft during the transfer operation.
Figure 65:
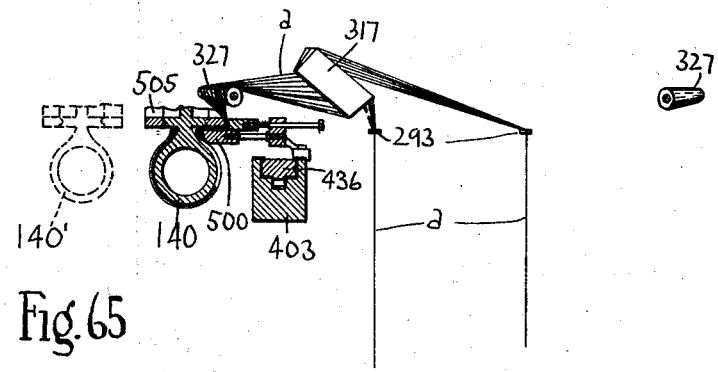
Fig. 65 is a similar view showing the application of the bead.
Figure 66:
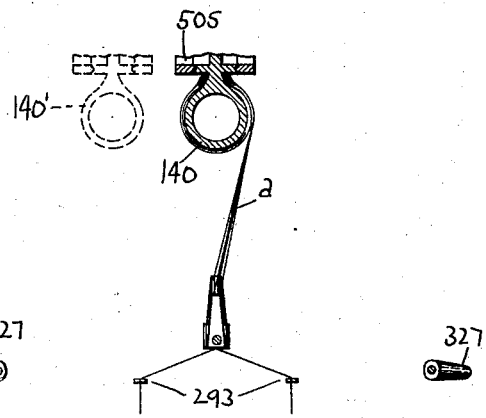
Fig. 66 is a similar view showing the core at the center of its stroke.

Preferably the location of the cradle is such that the fresh core is in proper relation to the one about to be removed. If not, the spider carrying the fresh core must be moved into such position before set screw 573 is tightened. Assuming the fresh core to have been clamped in this position (Fig. 65), in which the cores are at such a distance apart that cords stretched between them will provide the desired length of free ends after having been severed as described, the two cores now fixed on shaft 141 are carried to the left in Fig. 1 by reciprocation of the shaft until they have started to pass through the cord guiding annulus to the other side of the machine (Fig. 66). A tool illustrated in Fig. 47 is then employed to slide both cores towards the end of the shaft until the fresh core is in the position formerly occupied by the first core. Both cores are then clamped, the shaft carried to the end of its stroke, and a bead formed upon the fresh core on the side remote from the built-up carcass. The cords are now anchored in both carcasses (Fig. 68) and can be severed without losing their condition of tension or position.

The tool for moving the cores along the shaft comprises a head 580 rotatable on ball bearings 581 mounted on a sleeve 582. Both sleeve 582 and a handwheel 583 are pinned at 584 to a screw 585 upon which is threaded a nut 586 adapted to seat in the end of shaft 141. Hooked arms 587, suitably designed to pass between the arms of the spiders and engage with the rear of the second spider, are pivoted at 588 to the head. In use the arms are caused to engage with the spider and the hand-wheel rotated, whereby the spiders will be drawn along the shaft to the extent desired. A spacing plug or yoke 589 may be positioned between the spiders to keep them at the proper spacing.

*Rubber sheet supplying device (Figs. 43 and 44).*

In order to facilitate the cord laying operations it is sometimes preferable to supply them without being coated with rubber, and to apply sheets of uncured rubber between the plies of cord as the latter are laid upon the core. Such a rubber sheet may also be used to provide sufficient rubber to flow into the spaces between the cords at the crest of the core, for due to the curved shape of the core the cords will always be less closely compacted at the crest than near the beads. I have shown in Figs. 43 and 44 a device adapted for applying the rubber to the partially formed carcass for this purpose.

The device is made attachable to the tool holder 476 previously referred to in the same manner that the bead wire supplying device is attached. The base part 600 of the tool has a taper wedge 601 fitting in the dovetail of the tool holder, and has a handle 602 provided with a latch 603 as described in connection with the bead wire device. The base plate has an arm 604 affixed thereto, to suitable lugs on which are attached pins 605. Pivoted on these pins, and pressed towards the core by springs 606, are arms carrying rubber supplying and affixing rollers 607. Springs 606 act upon the supplying rollers 607 through arms 609 carrying rollers 610 which rest upon the rollers 607 for the purpose both of pressing the latter against the core and of exerting tension on the rubber as it is drawn off. The rubber, being rather tacky, since it is in an uncured condition, is usually wound up between turns of a liner such as a strip of muslin or holland cloth. The rubber adheres to the core, while the liner may be either wound on rolls 610 or may be allowed to accumulate upon guards 611 as indicated in dotted lines 612 at the left of Fig. 43.

When a layer of cords has been completely laid, the tool just described is mounted on the tool holder and the carrying ring revolved at its lower speed, the ends of the rubber strips carried on rolls 607 being previously stuck to the core. The rotation of the tool holder will cause the rubber to be unwound from the rolls and laid upon the tire, the liner meanwhile being taken care of as described. The rolls are ordinarily provided with sufficient rubber for one tire. The operator, through the control handle 465 (Fig. 24) causes the driving ring to carry the tool through practically an entire circumference. He then severs the rubber and butts the cut end against the end first laid. This leaves the carcass with three rubber sheets thereon, each attached adjacent their centers. It is now necessary to smooth the remainder of the strips to the core. This is accomplished through the aid of a device now to be described.

Figure 50:
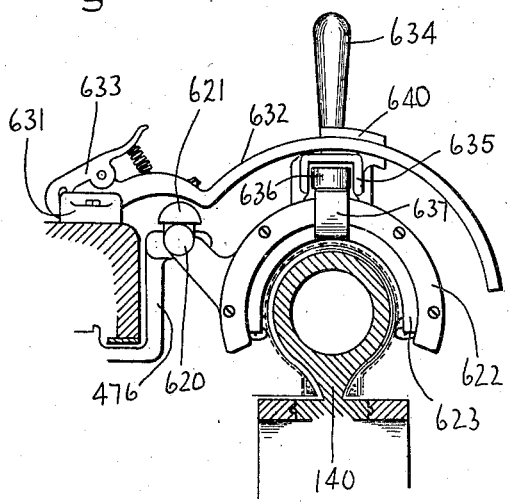
Fig. 50 is a section of a portion of the bead applying mechanism and an associated core, showing the use of a device for removing air pockets from a layer of rubber placed over a cord layer.
Figure 51:
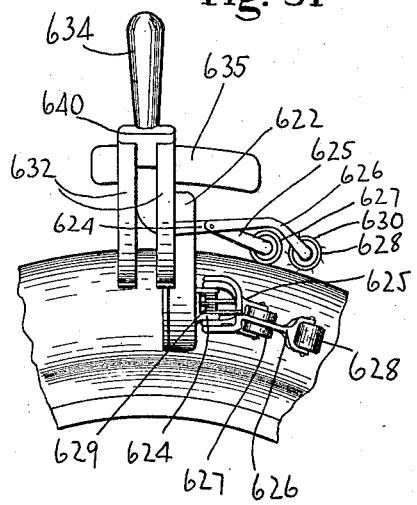
Fig. 51 is a side view thereof.

Sheet rubber rolling device (Figs. 50 and 51).

The rubber strips laid circumferentially of the core, as previously described, are rolled tightly against the underlying material and any air pockets simultaneously removed by a tool shown in Figs. 50 and 51. This tool is attachable to the tool holder 476 by a base 620 and a handle latch 621 in a similar manner to the wire carrier and the rubber applying device. The base part 620 is formed with a trackway 622 in which a segment 623 has a limited travel. This segment carries three lugs 624, to which are pivoted yokes 625 and 626, carrying rollers 627 and 628 respectively, and pressed towards the core 140 by springs 629. Rollers 625 are preferably smooth surfaced, while rollers 628 have needle points 630 on their surfaces to puncture the rubber sheet and insure the removal of entrapped air.

When the tool is first applied, these rollers bear against the centers of the three rubber sheets, and press them into place as the tool holder revolves around the core under the influence of motor 471. In order to smooth down the balance of the rubber strips, the segment 623 is oscillated in the trackway by mechanism supported in a stationary position on clam-shell segment 402. For this purpose the clam shell is provided with a holder 631 having a tapered dovetailed groove similar to that in the end of tool holder 476. Fitting in this dovetail groove is a two-part guideway 632 having a latch 633 by which it may be held in place. Sliding in this trackway is a member 640 having a handle 634 and an inverted tapered trough 635 located within the guideway. Adapted to fit in this trough is a roller 636 secured to an arm 637 mounted on segment 623. As the tool holder rotates around the core the roll 636 will be brought repeatedly to the trough 635, and if the latter be moved slowly from side to side, the roll 636, and consequently the segment 623 with its attached rolls, will be moved so that the rolls 627 and 628 will be caused to press against all parts of the tire successively.

Figure 48:
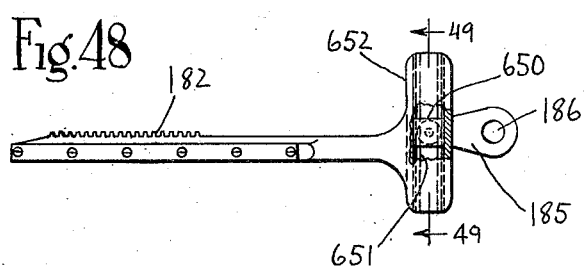
Fig. 48 is a detail of a modification of the crank mechanism shown in Fig. 6.
Figure 49:
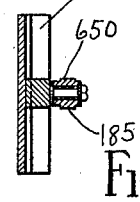
Fig. 49 is a section on line 49—49 of Fig. 48.

Modified crank drive (Figs. 48 and 49).

The crank mechanism previously described is simple in construction and will coordinate the travel of the core and the motion of the cord guiding arms with the rotation of the core with sufficient accuracy for most purposes. For very accurate cord laying, however, a modification of this mechanism is desirable. The reason for this change is the fact that a crank and connecting rod does not give a precisely symmetrical motion. When the crank travels ninety degrees from one point where the crank and connecting rod are in line, the parts driven by the connecting rod have not traveled quite a quarter of their cycle. In the present machine, the core is reciprocated and the cord guiding arms driven by cranks, while the rotation of the core is controlled by elliptical gears without the intervention of cranks.

On account of the unsymmetrical type of motion given by the cranks, the conditions with respect to the angular position of the cords, which are controlled by the elliptical gears, will not exactly correspond during motion of the core in opposite directions, which is controlled by the cranks.

In Figs. 48 and 49 I have illustrated one form of mechanism which may be used to correct the slight inaccuracy noted. Crank 185 and rack 182 are as described above. Instead of connecting the cranks to the rack by a rod, however, a block 650 is fixed to the pin at the end of the crank, and slides in ways 651, preferably dovetailed, in an enlargement 652 of the end of the rack. This type of mechanism will give a true harmonic motion to the rack, symmetrical with respect to the vertical positions of the crank, and will cause the angular positions of the cords to correspond in both directions of travel of the core.

Modified cord feeding arms (Figs. 53, 54, 55, and 56).

In Figs. 53 to 56 I have illustrated a modification of the guiding devices carried by the inner ends of the cord guiding arms. In this case each arm 250 carries at its inner end a yoke 660, attached to the cord arm by bolts 661, and formed with a transverse bar 662 having trackways 663 on opposite sides. Sliding on the bar is a carriage 664 having rollers 665 fitting in the trackways and rollers 666 at right angles to rollers 665 to give lateral bearing. In Fig. 53 the carriage has been shown in full lines in its central position and in dash lines in its position at the left end of the bar. Attached to the carriage is a spring 667, which extends between grooved rollers 668, over a roller 669, and is secured at 670 to the cord arm. This spring tends to hold the carriage in its central position, but permits it to travel along the trackway under the influence of the cords a.

Pivoted to the carriage by a pintle 671 is a member 672, having pivoted thereto at 673 a two-part guide 674. This guide has a portion 675 with holes adapted to arrange the cords in staggered relation, and a portion 676 with holes adapted to receive the cords as guided from portion 675 and arrange them in parallel relation. Carried by yoke 660, and pivoted at 677 so as to have a limited rotation, are guide plates 678, arranged to receive the cords as guided from plates 293 on the cord arms and to direct the cords to the pivoted two-part guide on the carriage. The central part of the member 664 is provided with a lug 679 (Fig. 55) adapted to fit into recesses 680 (Fig. 53) at the ends of the bar 662, for a purpose to be described. I have shown in Fig. 54 the guides 675 and 676 connected in one instance by a flexible tube 681 preferably made of spring wire. Such tubes will offer less friction to the cords, will guide the cords in a better manner, and will indicate by the degree of flexing of their outstanding ends any inequality of tension in the several cords.

Operation of machine.

The mechanism previously described in detail is designed to operate upon a sufficient number of individual cords or strands to form a sheath completely surrounding the major circumference of the tire core. The cords are supplied in four sets, as previously described, to the guiding plates and shuttles on the series of swinging cord arms. As the core is passed through the circular series of arms these are given a swinging motion carrying the cords across the core and down its sides. The cord laying operation can best be described with reference to two sets of views, Figs. 57 to 61, which represent the relative motion of the core reciprocating and cord arm driving mechanisms, and show generally the position of the core relative to the cord guiding devices; and Figs. 63 to 68, which are intended to show more particularly the manner in which the cords are laid upon the core and the beads applied. For convenience in description, the operation will be considered from a point after the cords have been started on a core by the transfer operation discussed above, one bead placed, and the core moved to the position of Figs. 57 or 63.

Figure 57:
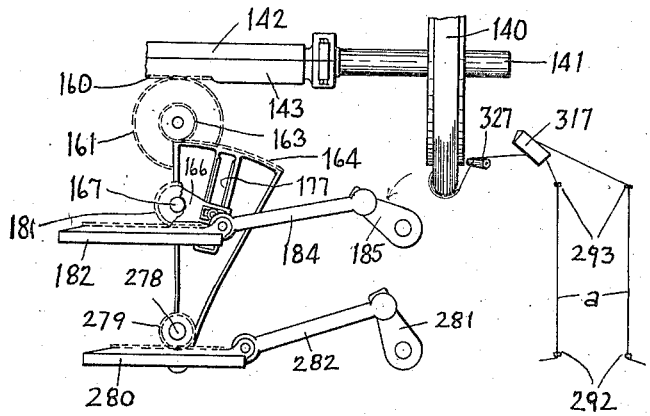
Fig. 57 is a diagrammatic view showing the relative position of the cord arm and core operating devices with the core at one extreme of movement.
Figure 58:
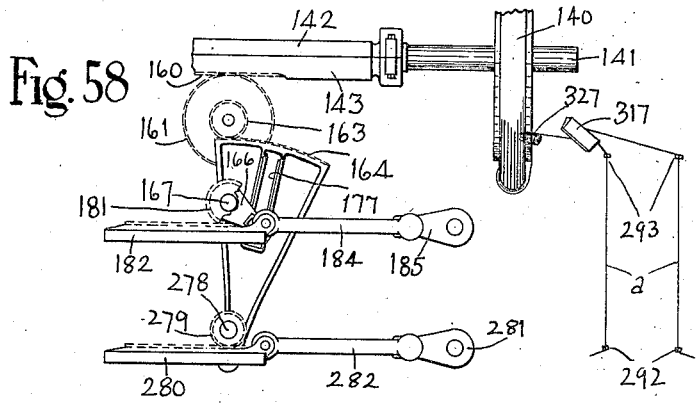
Fig. 58 is a similar view showing the core in the bead applying position.
Figure 63:
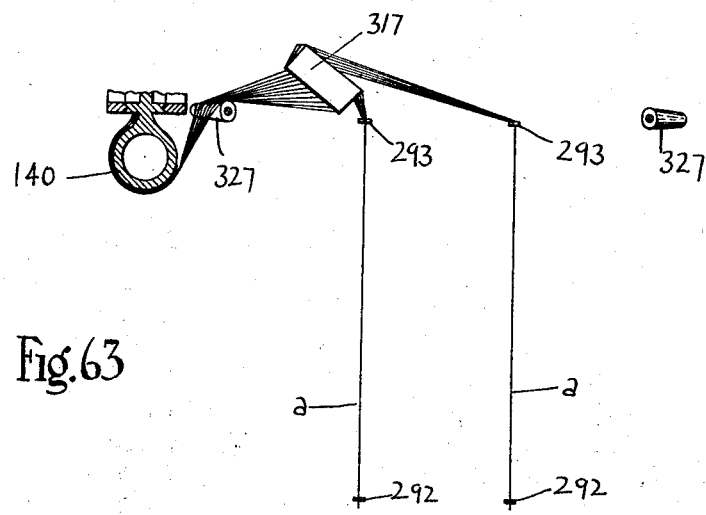
Fig. 63 is a diagrammatic view illustrating the application of cords from one cord guiding shuttle to the core, with the core in its extreme position corresponding to Fig. 57.

With the core in this position the cord arms are nearly in their innermost position, and the rollers 327 hold the cords adjacent the bead flanges of the core (Figs. 57 and 63). Crank 185 has not quite reached its horizontal position, and accordingly oscillating crank 166 is not in its position of maximum rotation, but is in place to cause the greatest displacement of sector 164, and accordingly to locate the core at one extreme of its stroke. Crank 281, which controls the cord arms, and which it will be remembered is geared to rotate twice as fast as the crank 185 which reciprocates the core, is even further from its horizontal position than crank 185.

In Figs. 58 and 64 the cranks 185 and 281 have both attained their horizontal positions. Rack 280 is therefore moved into its extreme position in which the rolls 327 are carried to points within the bead flange 505. The oscillating crank 166 (Fig. 58) is, by the movement of rack 182 to its extreme position, carried to its limit of rotation, which is beyond the position which gives maximum displacement to the sector 164. The sector is thus given a slight motion towards its central position, causing the core to likewise move a short distance towards the central point of its travel. This is apparent from Fig. 64, or from a comparison of the core positions in Figs. 57 and 58. The core is stopped in this position by releasing the central clutch lever 116, which operates the main clutch.

The cords are now held by rollers 327 so that they extend from the crest of the core past the bead flanges 505 (Fig. 64). The bead forming device on the side of the central annular frame adjacent the core, is now brought into encircling relation to the core by the mechanism described, and the sectional, trough-shaped bead filler 481 placed on the ledge formed by the outer surface of clamping ring 504, which may be in the position shown in Fig. 64 or may be moved, by shifting the bead mechanism by handwheel 365, into contact with the core flange 505 or to any intermediate position. The position in which the bead is wound will vary the tension imparted to the cord plies when these are afterward shifted into contact with the sides of the core. With the bead filler mounted in place the wire or other bead material is wound circumferentially in place by the tool illustrated in Figs. 41 and 42, the tool removed, and the whole bead mechanism moved towards the core by handwheel 365. This position is illustrated in Fig. 65, showing how the cords and bead are pressed into place by ring 500. The bead mechanism is now moved to a central position by handwheel 365, the clamp 432 holding the clam shells together released, and the bead mechanism backed off to inoperative position by the proper one of the two side control levers 116.

Figure 59:
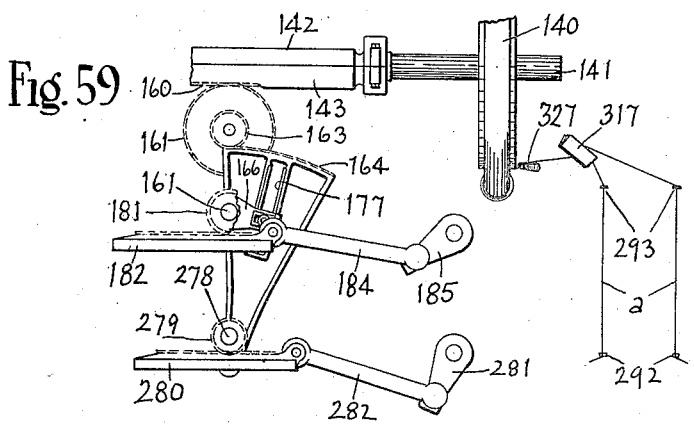
Fig. 59 is a similar view showing the core again in its extreme position upon its being again started in motion after the application of a bead.

The central clutch lever 116 is now operated to start the motion of the core. As crank 281 has passed the center, the cord arms will continuously move outwardly, but the core is first given a motion to its position furthest away from the center of its stroke, as indicated in Fig. 59. This is due to the first part of the reverse movement of oscillating crank 166 causing the sector 164 to be displaced to its maximum. The core then starts its travel towards the other end of its stroke. This slight motion of the core from the position of Fig. 58 to that of Fig. 59 gives the cord arms a chance to pass the bead flanges 505 in their outward motion. At the position of Fig. 59 the cord arms are moving relatively rapidly, due to the position of crank 281 near the center of its stroke, while the core is moving slowly on account of the position of crank 166 at right angles to the slot in the segment, causing the segment to move only slightly for a considerable movement of the crank. This gives the cord arms ample opportunity to clear the core as it travels to the right in these figures.

Figure 52:
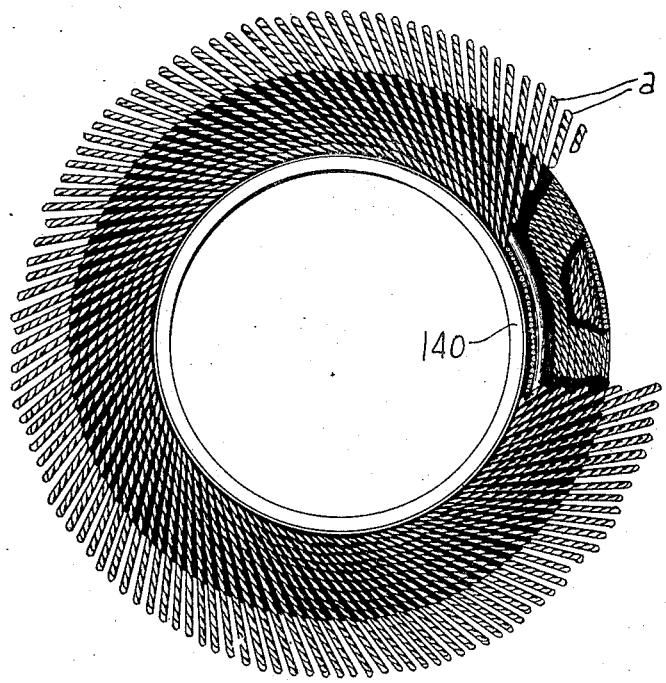
Fig. 52 is a diagrammatic side view, partly broken away, illustrating the disposition of the series of cords and the arrangement of the cord layers in a tire.
Figure 60:
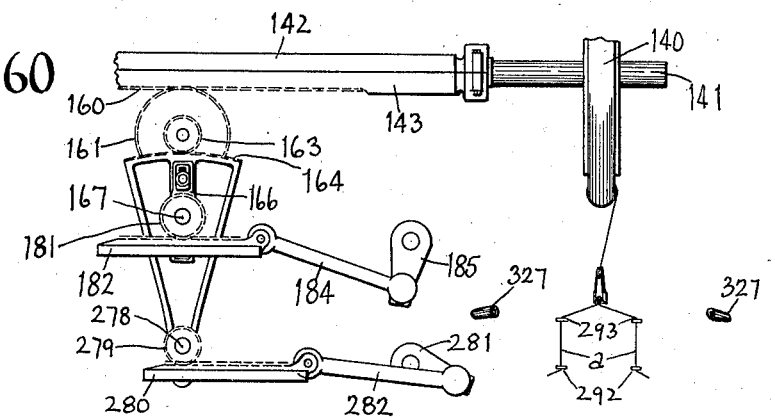
Fig. 60 is a similar view showing the core at its central position.

In Figs. 60 and 66 the core is indicated in the center of its stroke. This position is illustrative of the travel of the core and the action of the guiding mechanism, but has no especial significance, as the core is not stopped and no operation other than the continued laying of the cords in the travel of the core occurs. At this position the cord arms are swung to their outer positions, with the shuttles 317 in substantial alignment with the arms. The shuttles now present the cords to the core in a substantially uniform complete layer, as indicated in Fig. 52 (in which the size of the cords is somewhat exaggerated). It will be noted in Fig. 60 that while oscillating crank 166 is at the vertical center of its movement, crank 185 is slightly displaced from its vertical position. This is due to the departure from true harmonic motion involved when a connecting rod of fairly short length is used with a crank, and is a well recognized property of crank mechanisms. The only effect is to cause the crank 281 to be slightly off its horizontal center, setting the cord arms at not quite their outermost position when the core is at the center, and to cause a slight theoretical variation in the angle of the cords on account of the elliptical gears which control the rotation of the core being operated synchronously with crank 185 rather than with crank 166 which moves the core. This discrepancy is slight, and should cause no trouble in practice. It can be entirely obviated, however, if desired, by the use of the modified crank mechanism described in connection with Figs. 48 and 49.

Figure 61:
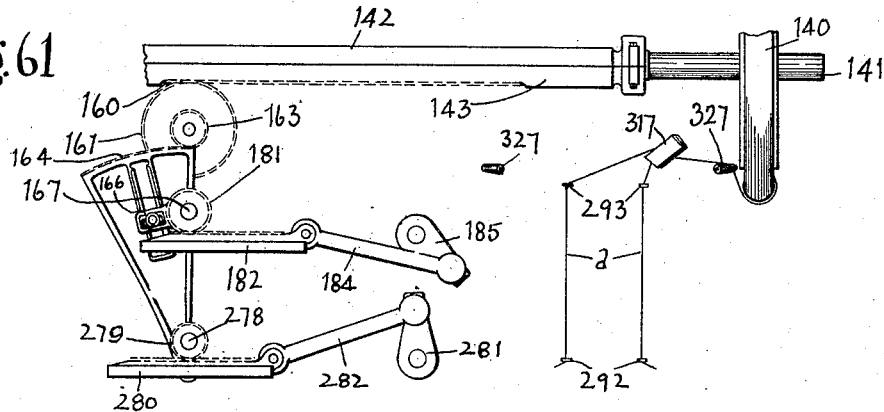
Fig. 61 is a view similar to Fig. 57 but showing the core at the opposite end of its stroke.
Figure 62:
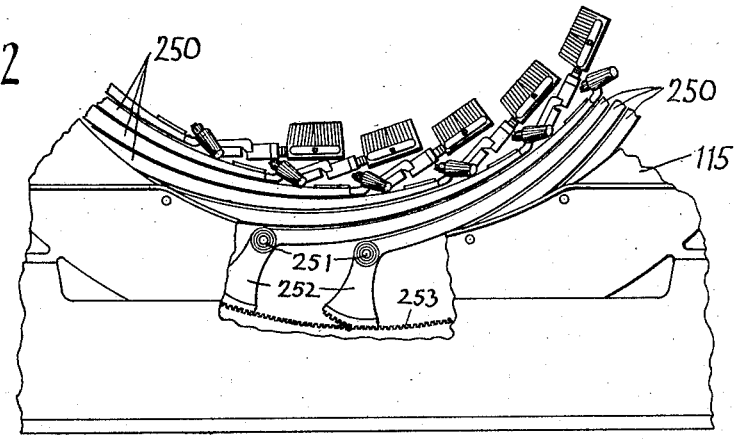
Fig. 62 is a detail similar to Fig. 15 but showing the cord arms at their outer positions.
Figure 67:
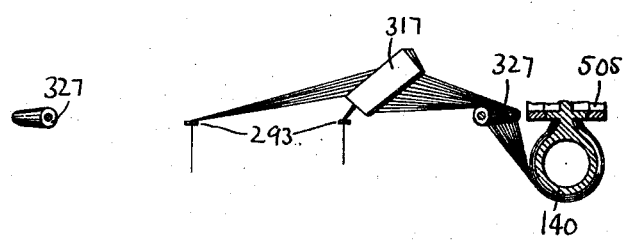
Fig. 67 is a view similar to Fig. 63 but showing the core at the opposite end of its stroke.
Figure 68:
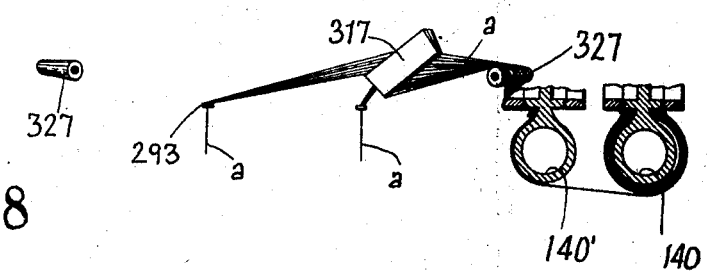
Fig. 68 is a view similar to Fig. 67 but showing the transfer operation.
Figure 69:
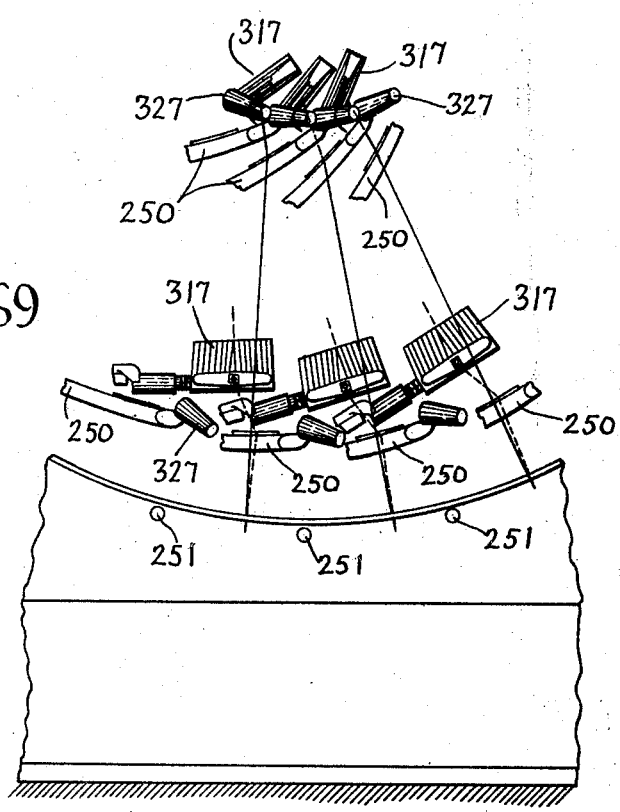
Fig. 69 is a diagrammatic detail illustrating two positions of the cord arms and the path of a typical cord in each case.

After the core has reached the limit of its motion toward the right the parts are in the positions of Figs. 61 and 67. These positions correspond to those of Figs. 57 and 63 except that the core is at the other end of its travel and hence the series of rollers opposite those operative in Fig. 57 are in action, and the bead is laid by that bead forming mechanism on the second side of the tire. It may be noted that as crank 281 has a motion twice as fast as crank 185 it is now back in substantially the position of Fig. 57, causing the cord arms to be in their inner position, while the crank 185, which controls the core position, is approximately 180° from the position in the earlier figure. The slight variation from exactly similar or opposite positions is due to the properties of crank mechanism previously mentioned, and can be eliminated, if desired, by the crank mechanism of Figs. 48 and 49. The same sequence of operations is now carried on in the formation of the bead as on the first side of the tire, with the exception that the bead forming mechanism on the other side of the central annulus 115 is employed.

Successive passages of the core through the guiding devices, and successive applications of the beads, are repeated until the desired number of plies have been laid. The last bead is laid in the position of Fig. 65 and the second core (indicated at 140' in dash lines) is located adjacent it on shaft 141 by the means previously described. After the cores have been carried by the movement of shaft 141 to about the position of Fig. 66 the machine is stopped, and the two cores unclamped and moved along the shaft by the tool shown in Fig. 47 until the fresh core is in the position formerly occupied by the core carrying the built-up carcass. The cores are then again clamped, and carried through by the movement of the shaft to the right hand end of the stroke. The fresh core, with one layer of cords passing over its surface, is then in the position of the core shown in Fig. 67. The first bead is now applied to the left hand side of the fresh core, as viewed in that figure, and after the cords have been thus anchored they are severed between the cores, and the first core removed. Building of a tire on the second core is then proceeded with as in the case of the first core. Successive cores may be supplied and the building of tire carcasses continued until the desired number have been completed, without at any time relaxing the tension of the cords or relasing them from proper position.

It will be observed from Figs. 63 to 68 that the cord guiding shuttle 317 follows the cords in their movement and turns into different position as required by the shifting positions of the core and cord arms, so that the cords are always guided to the core accurately and in natural positions. This is accomplished by the double pivoting of the shuttle, both at 307 and 316, as previously described. The angular position of the shuttles in their inner positions (Figs. 63 and 67) causes the cords to be presented to the core in overlapping groups, as appears in Fig. 2 of my Patent No. 1,422,046.

By the use of the modified cord arm mechanism described in connection with Fig. 53, the rollers 327 are omitted, and the structure of the shuttle somewhat changed. The main functional differences are in causing the shuttle to travel to positions more nearly adjacent the core, and in furnishing the necessary steady cord tension by the motion of the cord arms and the action of springs 667 rather than by the springs 326 in the shuttle. With this modified structure, the carriage 664 will move back and forth in the guiding grooves as required by the tension in the cords. The guides 675 and 676, being freely pivoted, will turn so as to keep the cords in the positions they naturally tend to assume. As indicated in dash lines in Fig. 53, the guides have swung to a position substantially at right angles to that which they assume when the carriage is at its center. In the dash line position, the core is in substantially the position of Fig. 63. As the core moves from this position to that of Fig. 64, the tendency would be for the carriage 664 to move towards its central position. It is to prevent this motion, and to compel the cord guides to press the cords around the core flange 505, that the catch shown in Figs. 55 and 56 is provided. This catch operates by an upward pull of the cords on the cord guides 675 and 676—a condition arising when the cord guides pass within the core flange 505. With the catch 679 in recess 680, the carriage is held stationary on the bar 662 while the core is backed over it by the slight intermediate reciprocation illustrated in Fig. 64. As the cord arms again move outwardly the catch is released by the swinging of member 672, and the carriage rendered free to move along the bar under the influence of the cords.

While I have described in some detail various features of construction, I do not intend to limit myself to these details except as particularly specified in the appended claims. I recognize that changes in the mechanical embodiment may be made without departing from the invention. Some of these changes I have indicated, but in any event I wish to claim the invention both in its specific aspects and as broadly as the law will permit.

Having thus described my invention, I claim:

1. In a tire building apparatus, a tire building support, a supply adapted to present to the support a circumferential series of cords, and a series of guiding devices individually movable towards and away from the axis of the support and adapted to guide the cords at points between the supply and their points of attachment to the support.

2. In a tire building apparatus, a circular tire building support having undercut side portions and flanges located inwardly of said undercut portions and having bearing surfaces, means for laying a circumferential sheath of cords from one side of the core around the periphery and down the opposite side so as to bridge the undercut portion on said side and be in contact throughout its circumference with the bearing surface of the associated flange, said means maintaining the cords individually under uniform tension and means for then pressing the sheath into the undercut portion of said last mentioned side of the support.

3. In a tire building apparatus, a circular tire building support having undercut side portions, guiding devices for carrying a circumferential ply of tire building material down the side of the support in sections twisted with reference to each other, and means for laying the twisted sections flat upon the sides of the support.

4. In a tire building apparatus, a tire building support, a plurality of cord guiding devices arranged about a circumference coaxial with the support, means for reciprocating the support through said devices, and means for moving said devices towards the axis of the support.

5. In a tire building apparatus, a tire building support, a plurality of cord guiding devices arranged about a circumference coaxial with the support, means for relatively moving the support and said devices along their common axis, means to relatively rotate the support and said devices about such axis, and means to move said devices towards the axis of the core.

6. In a tire building apparatus, a tire building support, means for holding extended across the support and to one side thereof a circumferential sheath of cords, and a sectional bead applying instrumentality adapted to close about the series of cords for applying a bead unit in encircling relation thereto.

7. In a tire building apparatus, a tire building support, means for holding extended across the support and to one side thereof a circumferential sheath of cords, a sectional bead applying instrumentality adapted to close about the sheath for applying a bead in encircling relation thereto, and means for moving said instrumentality into and out of encircling relationship with the sheath.

8. In a tire building apparatus, a tire building support, means for holding extended across the support and to one side thereof a circumferential sheath of cords, a sectional bead applying guide adapted to close about the sheath, and a shuttle carried by said guide for applying bead material around the sheath.

9. In a tire building apparatus, a tire building support, means for holding extended across the support and to one side thereof a circumferential sheath of cords, a sectional bead applying guide adapted to close about the sheath, a shuttle carried by said guide for applying bead material around the sheath, means for moving the guide into and out of encircling relationship with the sheath, and means for rotating the shuttle about the sheath.

10. In a tire building apparatus, a tire building support, means for holding extended across the support and to one side thereof a circumferential sheath of cords, a transversely movable carriage, guiding segments pivoted by the carriage and adapted to close together to encircle the sheath, and a shuttle movable around the guiding segments when in closed position to carry bead material around the sheath.

11. In a tire building apparatus, means for extending circumferentially arranged material across a tire building support, a pair of clam-shell segments pivoted together and adapted to close about the material, and a rotatable shuttle carried by the segments.

12. In a tire building apparatus, means for extending circumferentially arranged material across a tire building support, a pair of clam-shell segments pivoted together and adapted to close about the material, said segments forming when closed an annular trackway, a ring formed of semicircular segments rotatable in the trackway and adapted to carry a device for operating upon the tire being built, and means for rotating the rings when the segments are in closed position.

13. In a tire building apparatus, means for extending circumferentially arranged material across a tire building support, a pair of clam-shell segments pivoted together and adapted to close about the material, a shuttle rotatable around the segments when in closed position, opposed bevel gear segments carried by the two segments, a bevel pinion meshing with both gear segments, and mechanism for rotating the bevel pinion to open or close the clam shells.

14. In a tire building apparatus, means for extending circumferentially arranged material across a tire building support, a pair of clam-shell segments pivoted together and adapted to close around the material, a shuttle rotatable around the segments when in closed position, opposed bevel gear segments carried by the two segments, a bevel pinion meshing with both gear segments, means for reciprocating the segments, and gearing operated by the reciprocation of the segments for rotating the bevel pinion to open or close the clam-shell segments.

15. In a tire building apparatus, a tire building support, a plurality of cord guiding devices arranged about a circumference coaxial with the support, means for repeatedly passing the support through said devices from one side to the other of said devices, and means for moving said devices towards the axis of the support, whereby the cords so guided are carried across the support and down the sides thereof in a series of reversely laid courses.

16. In a tire building apparatus, guiding means for a circumferential series of cords, supplying means adapted to deliver cords in horizontal sheets to the top and bottom of said guiding means, means to deflect the cords from their horizontal positions into position to be received by the guiding means, a core, and supporting means for the core overhanging the lower sheet of cords.

17. In a tire building apparatus, a reciprocable tire building support, a circumferential series of guiding devices for presenting a circumferential series of cords to the support, and means for moving such devices towards and from the axis of the support, said devices being mounted for lateral movement so that they may follow the cords during the reciprocation of the support.

18. In a tire building apparatus, a reciprocable tire building support, a circumferential series of swinging arms arranged about the axis of travel of the support, cord guiding devices carried by said arms, and mechanism for swinging the arms in coordination with the travel of the support whereby the cords are carried over the support and down both sides thereof.

19. In a tire building apparatus, a reciprocable tire building support, a circumferential series of arms arranged about the axis of travel of the support, cord guiding devices carried by the arms, mechanism for moving the arms in coordination with the travel of the support whereby the cords are carried over the support and down the sides thereof, and devices carried by the arms for constricting the cords towards the axis of the support at a circumference adjacent the support.

20. In a tire building apparatus, a reciprocable tire building support, a circumferential series of arms arranged about the axis of travel of the support, cord guiding devices carried by the arms, mechanism for moving the arms in coordination with the travel of the support whereby the cords are carried over the support and down the sides thereof, and a series of angularly disposed overlapping rollers carried by the arms and adapted to press on the cords to constrict them towards the axis of the support.

21. In a tire building apparatus, a supply for a circumferential series of cords, a tire building support, means to reciprocate the support through the supply, and means to rotate the support during its reciprocation comprising a pair of meshing elliptical gears adapted to cause more rapid relative rotation towards the center of its reciprocation than near the ends thereof.

22. In a tire building apparatus, a supply adapted to present building material in circumferential arrangement; a tire building support; and mechanism to reciprocate and rotate the support relative to the supply, comprising a rotatable shaft upon which the shaft is carried, means to rotate the shaft in any longitudinal position thereof, a square shaft through which the rotatable shaft passes, means to restrain the rotatable shaft from endwise movement in the square shaft while permitting it to rotate, and means for reciprocating the square shaft.

23. In a tire building apparatus, a supply adapted to present building material in circumferential arrangement, a tire building support, a rotatable shaft upon which the support is carried, a square shaft through which the rotatable shaft passes, a bearing to support the square shaft for reciprocation but not for rotation, means to restrain the rotatable shaft from endwise movement relative to the square shaft while permitting it to rotate, a rack secured to the square shaft, a gear meshing with the rack, means to oscillate the gear to cause reciprocation of the support, a gear secured to the rotatable shaft, a pinion meshing therewith, a shaft attached to the pinion, a rotatable member through which the shaft passes, a splined connection between the shaft and the member to permit relative reciprocation between them while constraining them to rotate together, and means to rotate the member to cause rotation of the support.

24. In a tire building apparatus, a tire building support, a slide upon which the support is carried, and means for giving to the slide a reciprocating motion whereby it is caused to travel to its limit in one direction, move a short distance in the opposite direction and return to its said limit, and repeat such motion at each end of its reciprocating stroke.

25. In a tire building apparatus, guiding devices adapted to guide a series of cords in circumferential arrangement, a tire building support, and mechanism to reciprocate the support through the guiding devices from one side to the other to lay the cords on the support in a series of reverse layers and to give the support a minor movement of reciprocation towards and away from the guiding devices at each end of its major reciprocation.

26. In a tire building apparatus, guiding devices for circumferentially arranged material, a tire building support, and mechanism for reciprocating the support comprising a rack connected to the support, a rocking slotted segment operatively connected to the rack, a crank having a pin sliding in said slot, and means for oscillating the crank.

27. In a tire building apparatus, guiding devices for circumferentially arranged material, a tire building support, and mechanism for reciprocating the support comprising a rack connected to the support, a rocking slotted segment operatively connected to the rack, a crank having a pin sliding in said slot, and means for oscillating the crank beyond its maximum throw in either direction, whereby the support is given a major reciprocation relative to the guiding devices and a minor movement of reciprocation towards and away from the guiding devices at each end of the major reciprocation.

28. In a tire building apparatus, guiding devices for circumferentially arranged material, a tire building support, and mechanism for reciprocating the support comprising a rack connected to the support, a rocking slotted segment operatively connected to the rack, a crank having a pin sliding in said slot, a pinion connected to the segment, a rack meshing with the pinion, and crank means for reciprocating the rack.

29. In a tire building apparatus, guiding devices for circumferentially arranged material, a tire building support, and mechanism for reciprocating the support comprising a rack connected to the support, a rocking slotted segment operatively connected to the rack, a crank having a pin sliding in said slot, means for adjusting the throw of the crank, and means for oscillating the crank.

30. In a tire building apparatus, guiding devices for circumferentially arranged material, a tire building support, and mechanism for reciprocating the support comprising a rack connected to the support, a rocking slotted segment operatively connected to the rack, a crank having a pin sliding in the slot, means for adjusting the throw of the crank to vary the length of reciprocation of the support, means for oscillating the crank beyond its maximum throw in either direction, whereby the support is given a major reciprocation relative to the guiding devices and a minor movement of reciprocation toward and away from the guiding devices at each end of the major reciprocation, and means for adjusting the oscillating means whereby the length of the minor reciprocation may be varied.

31. In a tire building apparatus, guiding devices for circumferentially arranged material, a tire building support, means for giving to the support a major movement of reciprocation relative to the guiding devices, mechanism for adjusting the extent of such major reciprocation, means for giving to the support a minor movement of reciprocation at each end of its major reciprocation, and mechanism for adjusting the extent of such minor reciprocation.

32. In a tire building apparatus, guiding means for circumferentially arranged material, a single supporting shaft for tire building supports, a plurality of holding devices for such supports slidably mounted on the shaft, and means for reciprocating the shaft relative to the guiding devices.

33. In a tire building apparatus, guiding means for circumferentially arranged material, a single supporting shaft for tire building supports, a plurality of holding devices for such supports releasably mounted on the shaft, such supports being releasable for sliding along the shaft and constructed for assembly around the shaft, and means for reciprocating the shaft relative to the guiding devices.

34. In a tire building apparatus, guiding means for circumferentially arranged material, a supporting shaft for tire building supports, a plurality of holding devices for such supports releasably mounted on the shaft, such supports being releasable for sliding along the shaft and constructed for assembly around the shaft, means for reciprocating the shaft relative to the guiding devices, and a cradle for supporting a tire building support while in process of assembly around the shaft.

WILLIAM G. FORDING.